United States Patent
Lim et al.

(10) Patent No.: US 10,939,105 B2
(45) Date of Patent: Mar. 2, 2021

(54) METHODS AND APPARATUSES FOR ENCODING AND DECODING VIDEO USING SIGNAL DEPENDENT ADAPTIVE QUANTIZATION

(71) Applicant: Panasonic Intellectual Property Management Co., Ltd., Osaka (JP)

(72) Inventors: Chong Soon Lim, Singapore (SG); Takahiro Nishi, Nara (JP); Tadamasa Toma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/086,512

(22) PCT Filed: Mar. 23, 2017

(86) PCT No.: PCT/JP2017/011677
§ 371 (c)(1),
(2) Date: Sep. 19, 2018

(87) PCT Pub. No.: WO2017/164297
PCT Pub. Date: Sep. 28, 2017

(65) Prior Publication Data
US 2019/0075293 A1 Mar. 7, 2019

Related U.S. Application Data

(60) Provisional application No. 62/313,405, filed on Mar. 25, 2016.

(51) Int. Cl.
*H04N 19/124* (2014.01)
*H04N 19/18* (2014.01)
(Continued)

(52) U.S. Cl.
CPC ......... *H04N 19/124* (2014.11); *H04N 19/126* (2014.11); *H04N 19/14* (2014.11);
(Continued)

(58) Field of Classification Search
CPC ..................................................... H04N 19/124
(Continued)

(56) References Cited

U.S. PATENT DOCUMENTS

2015/0319437 A1* 11/2015 Zhang .................. H04N 19/176
375/240.03
2015/0373327 A1* 12/2015 Zhang .................. H04N 19/124
375/240.03

FOREIGN PATENT DOCUMENTS

JP            8-116450            5/1996

OTHER PUBLICATIONS

International Search Report (ISR) dated Jun. 20, 2017 in International (PCT) Application No. PCT/JP2017/011677.
(Continued)

*Primary Examiner* — Yulin Sun
(74) *Attorney, Agent, or Firm* — Wenderoth, Lind & Ponack, L.L.P.

(57) ABSTRACT

The encoding method includes: inverse-quantizing one or more first transform coefficients quantized; deriving a quantization parameter based on the one or more first transform coefficients inverse-quantized; and inverse-quantizing a second transform coefficient quantized, based on the derived quantization parameter.

9 Claims, 28 Drawing Sheets

(51) Int. Cl.
 *H04N 19/46* (2014.01)
 *H04N 19/126* (2014.01)
 *H04N 19/14* (2014.01)
 *H04N 19/159* (2014.01)
 *H04N 19/61* (2014.01)
 *H04N 19/91* (2014.01)

(52) U.S. Cl.
 CPC ........... *H04N 19/159* (2014.11); *H04N 19/18* (2014.11); *H04N 19/46* (2014.11); *H04N 19/61* (2014.11); *H04N 19/91* (2014.11)

(58) Field of Classification Search
 USPC .................................................. 375/240.03
 See application file for complete search history.

(56) References Cited

OTHER PUBLICATIONS

H.265 (ISO/IEC 23008-2 High Efficiency video coding (HEVC)), Dec. 1, 2013.

\* cited by examiner

FIG. 3

| TRANSFORM TYPE | BASIS FUNCTION $T_i(j)$, $i, j = 0, 1, ..., N-1$ |
|---|---|
| DCT - II | $T_i(j) = \omega_0 \cdot \sqrt{\dfrac{2}{N}} \cdot \cos\left(\dfrac{\pi \cdot i \cdot (2j+1)}{2N}\right)$ <br> WHERE $\omega_0 = \begin{cases} \sqrt{\dfrac{2}{N}} & i = 0 \\ 1 & i \neq 0 \end{cases}$ |
| DCT - V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$ <br> WHERE $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT - VIII | $T_i(j) = \sqrt{\dfrac{4}{2N+1}} \cdot \cos\left(\dfrac{\pi \cdot (2i+1) \cdot (2j+1)}{4N+2}\right)$ |
| DST - I | $T_i(j) = \sqrt{\dfrac{2}{N+1}} \cdot \sin\left(\dfrac{\pi \cdot (i+1) \cdot (j+1)}{N+1}\right)$ |
| DST - VII | $T_i(j) = \sqrt{\dfrac{4}{2N+1}} \cdot \sin\left(\dfrac{\pi \cdot (2i+1) \cdot (j+1)}{2N+1}\right)$ |

METHODS AND APPARATUSES FOR ENCODING AND DECODING VIDEO USING SIGNAL DEPENDENT ADAPTIVE QUANTIZATION

TECHNICAL FIELD

The present disclosure relates to encoding and decoding of images or video that uses quantization to compress information.

BACKGROUND ART

The wireless and wired transmissions of next-generation video (e.g., 4K/8K resolutions) demand coding efficiency that may be even beyond the current coding capability. Some researches and experiments related to adaptive quantization techniques were studied in the past, and the results have proven coding efficiency improvements. The adaptive quantization techniques are generally used to enable more flexibility at the encoder to allocate bits spatially between image blocks of the same picture or temporally between different pictures to improve the coding efficiency. In the prior arts for the previously mentioned techniques, the adaptive quantization techniques are usually image block based adaptation or picture based adaptation and require some form of signalling in the compressed bit stream at block level

CITATION LIST

Non-Patent Literature

[NPL 1] H.265 (ISO/IEC 23008-2 HEVC (High Efficiency Video Coding))

SUMMARY OF THE INVENTION

Technical Problems

In general, when a video encoder instructs a decision to a decoder to pick one mode out of many possible modes of operations, signal bits are required to be coded in a bitstream for these decisions. These signalling bits are quite significant when these decisions are in a small unit level (e.g. 4×4 block) and when the number of possible modes is large. Because of the concern in the size of these signalling bits, it is often preferred not to have the signalling at the smallest unit level. Such a problem reduces the coding efficiency of the adaptive tools.

In view of this, the present disclosure provides encoding methods and decoding methods for enhancing subjective image quality and increasing encoding efficiency in video encoding and decoding that use adaptive quantization techniques.

Solutions to Problems

An encoding method according to an aspect of the present disclosure includes: inverse-quantizing one or more first transform coefficients quantized; deriving a quantization parameter based on the one or more first transform coefficients inverse-quantized; and inverse-quantizing a second transform coefficient quantized, based on the derived quantization parameter.

A decoding method according to an aspect of the present disclosure includes: inverse-quantizing one or more first transform coefficients quantized; deriving a quantization parameter based on the one or more first transform coefficients inverse-quantized; and inverse-quantizing a second transform coefficient quantized, based on the derived quantization parameter.

These general and specific aspects may be implemented using a system, an apparatus, an integrated circuit, a computer program, or a computer-readable recording medium such as a CD-ROM, or any combination of systems, apparatuses, integrated circuits, computer programs, or recording media.

Advantageous Effects of Invention

The encoding methods and decoding methods according to aspects of the present disclosure enable enhancement of subjective image quality and increase in encoding efficiency in video encoding and decoding that use adaptive quantization techniques.

BRIEF DESCRIPTION OF DRAWINGS

FIG. 3 is a chart indicating transform basis functions for each transform type.

DESCRIPTION OF EXEMPLARY EMBODIMENTS

Hereinafter, embodiments are described in detail with reference to the drawings.

It is to be noted that each of the exemplary embodiments described below indicates a generic or specific example. The numerical values, shapes, materials, constituent elements, the arrangement and connection of the constituent elements, steps, the processing order of the steps etc. indicated in the following embodiments are mere examples, and therefore do not limit the scope of the Claims. Therefore, among the constituent elements in the following exemplary embodiments, constituent elements not recited in any one of the independent claims that define the most generic concept are described as arbitrary constituent elements.

Embodiment 1

(Encoding Device Outline)

Figure 1:
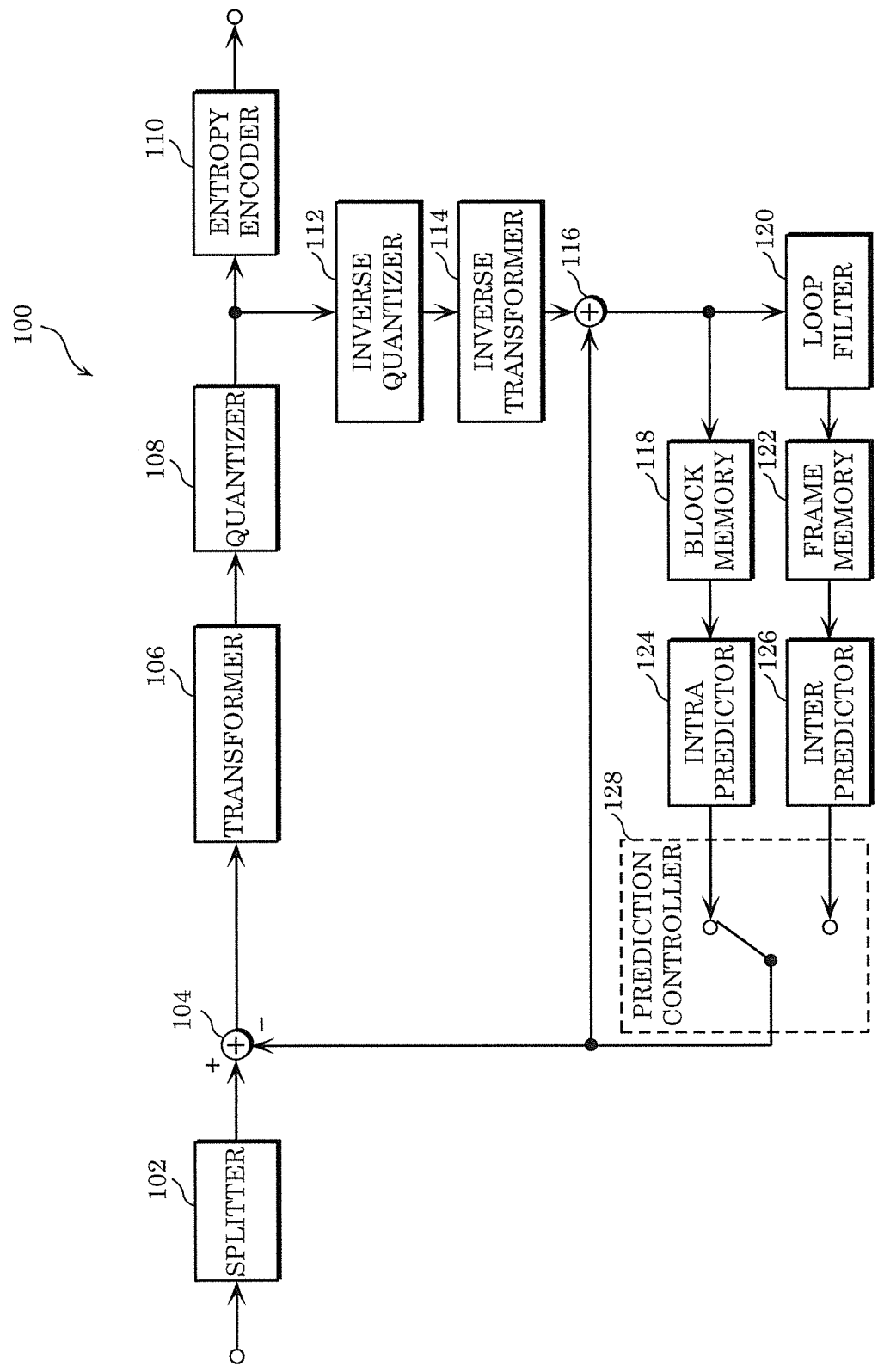
FIG. 1 is a block diagram illustrating a functional configuration of the encoding device according to Embodiment 1.

First, the encoding device according to Embodiment 1 will be outlined. FIG. 1 is a block diagram illustrating a functional configuration of encoding device 100 according to Embodiment 1. Encoding device 100 is a moving picture/picture encoding device that encodes a moving picture/picture block by block.

As illustrated in FIG. 1, encoding device 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoding device 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoding device 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoding device 100 will be described.

(Splitter)

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
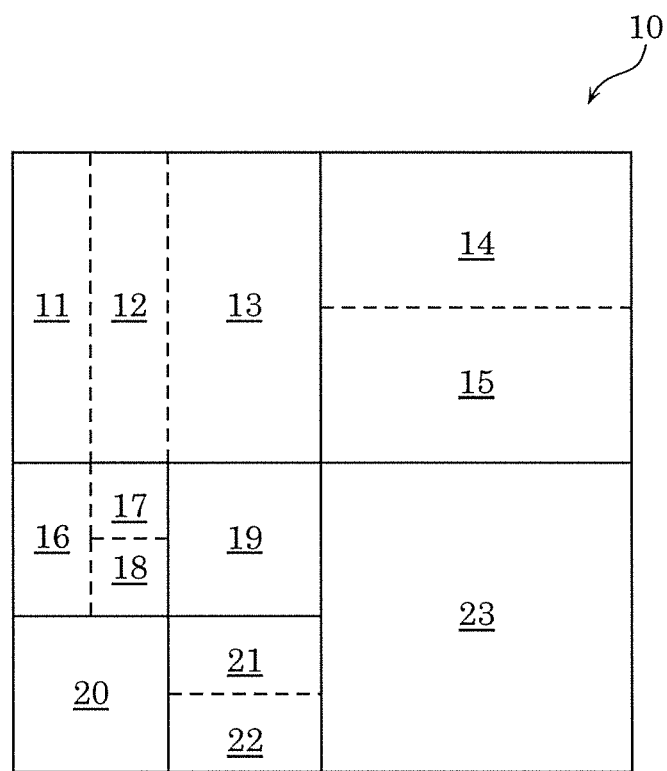
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

(Subtractor)

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoding device 100, and is a signal representing an image for each picture included in a moving picture (for example, a luma signal and two chroma signals). Hereinafter, a signal representing an image is also referred to as a sample.

(Transformer)

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

(Quantizer)

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

(Entropy Encoder)

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

(Inverse Quantizer)

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

(Inverse Transformer)

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

(Adder)

Adder 116 reconstructs the current block by summing prediction signals, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

(Block Memory)

Block memory 118 is storage for storing blocks in a picture to be encoded (hereinafter referred to as a current picture) for reference in intra prediction. More specifically, block memory 118 stores reconstructed blocks output from adder 116.

(Loop Filter)

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, C=5D+A). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
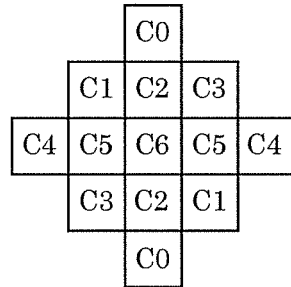
FIG. 4A illustrates one example of a filter shape used in ALF.
Figure 4B:
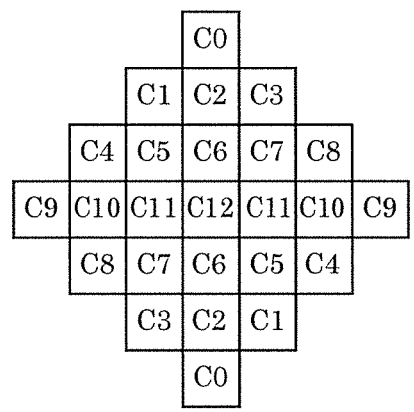
FIG. 4B illustrates another example of a filter shape used in ALF.
Figure 4C:
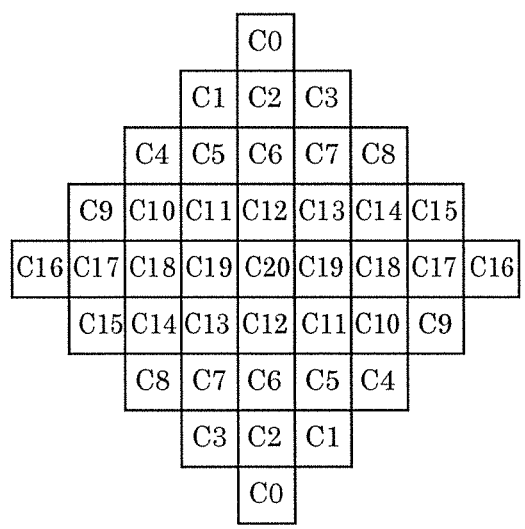
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signalled at the picture level. Note that the signaling of the coefficients set need not be performed at the picture level, and may be performed at another level (for example, at the sequence level, slice level, tile level, CTU level, CU level, or sub-block level).

(Frame Memory)

Frame memory 122 is storage for storing reference pictures used in inter prediction, and is also referred to as a frame buffer. More specifically, frame memory 122 stores reconstructed blocks filtered by loop filter 120.

(Intra Predictor)

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see NPTL 1).

Figure 5:
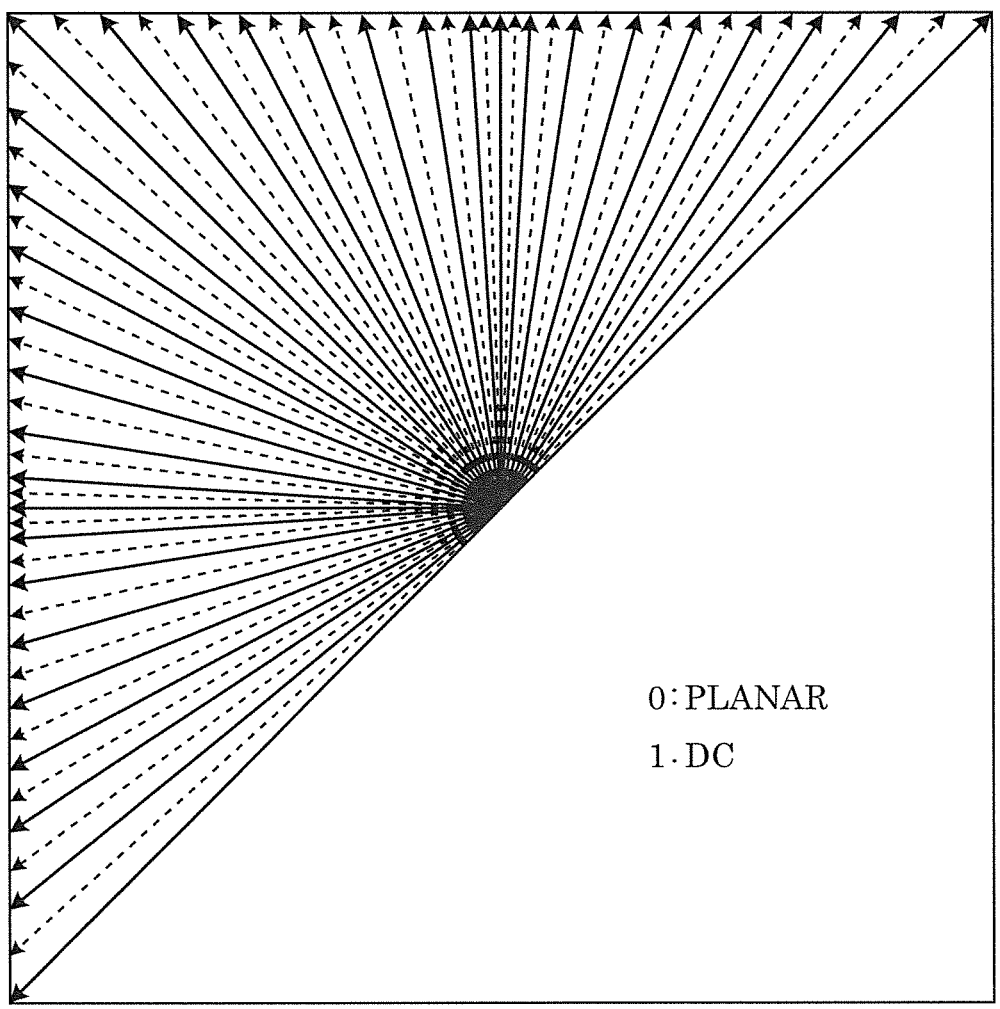
FIG. 5 illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5 illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

(Inter Predictor)

Inter predictor 126 generates a prediction signal (inter prediction signal) by inter predicting the current block with reference to a block or blocks in a reference picture, which is different from the current picture and is stored in frame memory 122 (also referred to as inter frame prediction).

Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Note that the motion information may be derived on the decoding device side without being signalled. For example, a merge mode defined in the H.265/HEVC standard may be used. Moreover, for example, the motion information may be derived by performing motion estimation on the decoding device side. In this case, motion estimation is performed without using the pixel values of the current block.

Here, a mode for performing motion estimation on the decoding device side will be described. A mode for performing motion estimation on the decoding device side is also referred to as pattern matched motion vector derivation (PMMVD) mode or frame rate up-conversion (FRUC) mode.

First, one candidate included in a merge list is selected as the starting point for the search by pattern matching. The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

Figure 6:
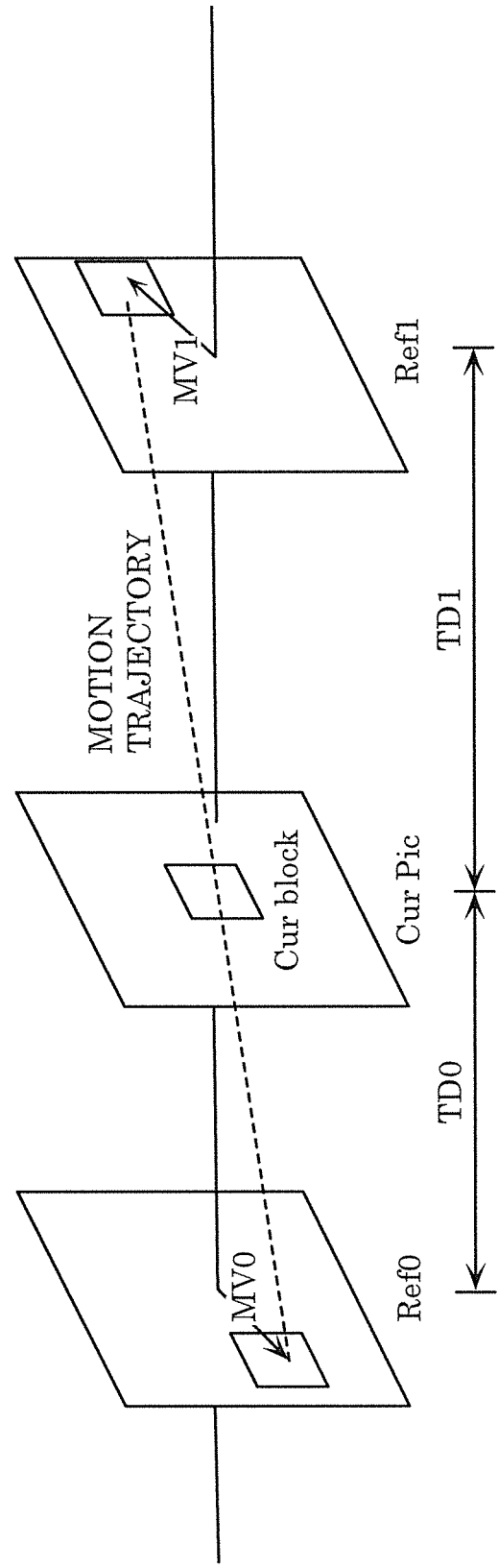
FIG. 6 is for illustrating pattern matching (bilateral matching) between two blocks along a motion trajectory.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1).

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture.

Figure 7:
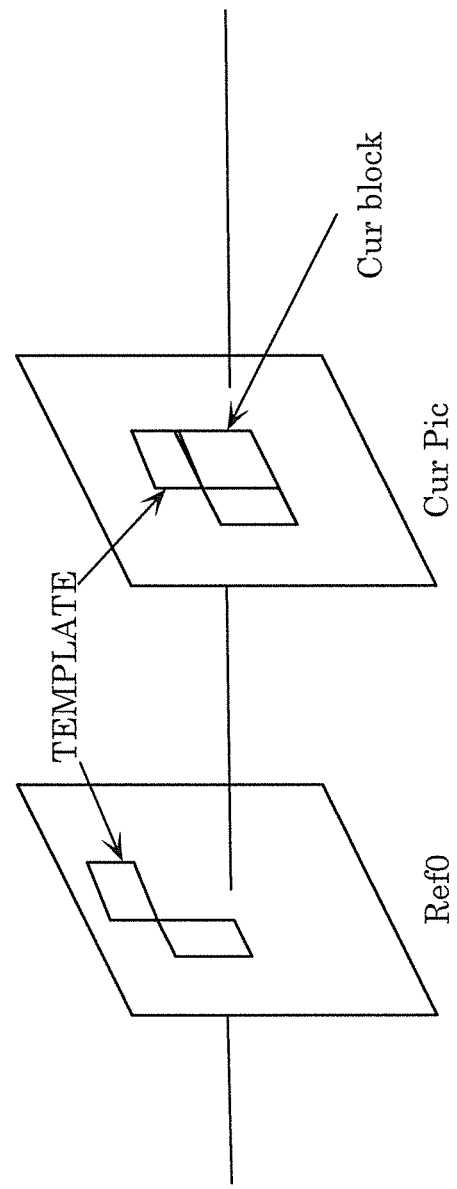
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic).

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

It is to be noted that motion information may be derived on the decoding device side using a method different from motion estimation. For example, the amount of correction for a motion vector may be calculated using the pixel value of a neighboring pixel in unit of a pixel, based on a model assuming uniform linear motion.

Here, a mode for deriving a motion vector based on a model assuming uniform linear motion will be described. This mode is also referred to as a bi-directional optical flow (BIO) mode.

Figure 8:
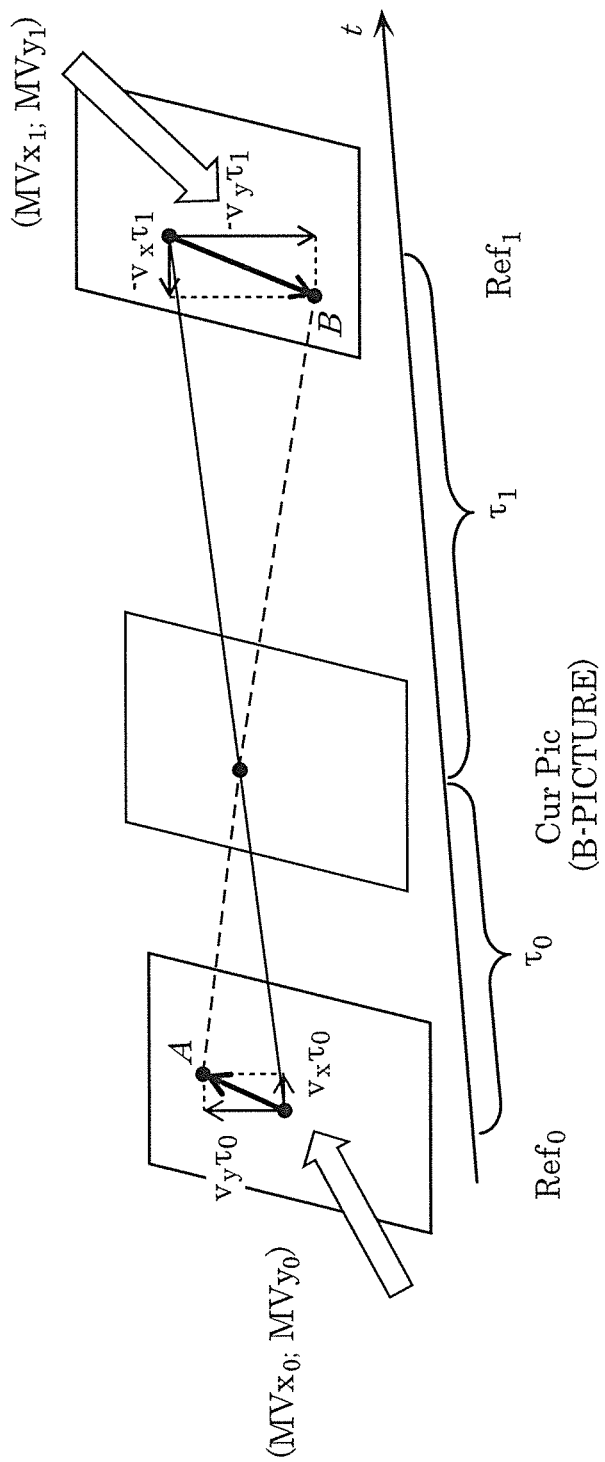
FIG. 8 is for illustrating a model assuming uniform linear motion.

FIG. 8 is for illustrating a model assuming uniform linear motion. In FIG. 8, $(v_x, v_y)$ denotes a velocity vector, and $\tau_0$ and $\tau_1$ denote temporal distances between the current picture (Cur Pic) and two reference pictures ($Ref_0$, $Ref_1$). ($MVx_0$, $MVy_0$) denotes a motion vector corresponding to reference picture $Ref_0$, and ($MVx_1$, $MVy_1$) denotes a motion vector corresponding to reference picture $Ref_1$.

Here, under the assumption of uniform linear motion exhibited by velocity vector $(v_x, v_y)$, ($MVx_0$, $MVy_0$) and ($MVx_1$, $MVy_1$) are represented as $(v_x\tau_0, v_y\tau_0)$ and $(-v_x\tau_1, -v_y\tau_1)$, respectively, and the following optical flow equation is given.

MATH. 1

$$\partial I^{(k)}/\partial t + v_x \partial I^{(k)}/\partial x + v_y \partial I^{(k)}/\partial y = 0. \qquad (1)$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoding device side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9:
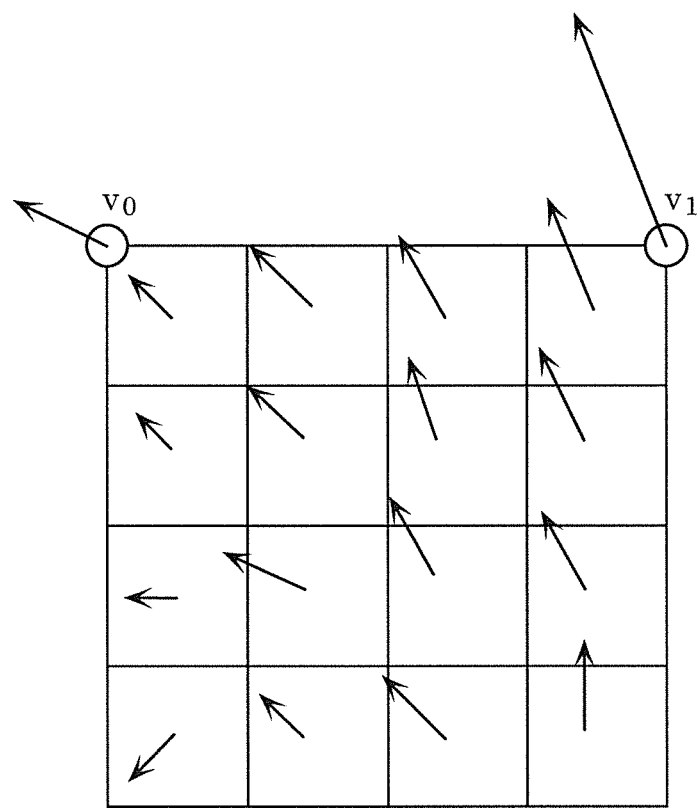
FIG. 9 is for illustrating deriving a motion vector of each sub-block based on motion vectors of neighboring blocks.

FIG. 9 is for illustrating deriving a motion vector of each sub-block based on motion vectors of neighboring blocks. In FIG. 9, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

MATH. 2

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).
(Prediction Controller)

Prediction controller 128 selects either the intra prediction signal or the inter prediction signal, and outputs the selected prediction signal to subtractor 104 and adder 116.
(Decoding Device Outline)

Figure 10:
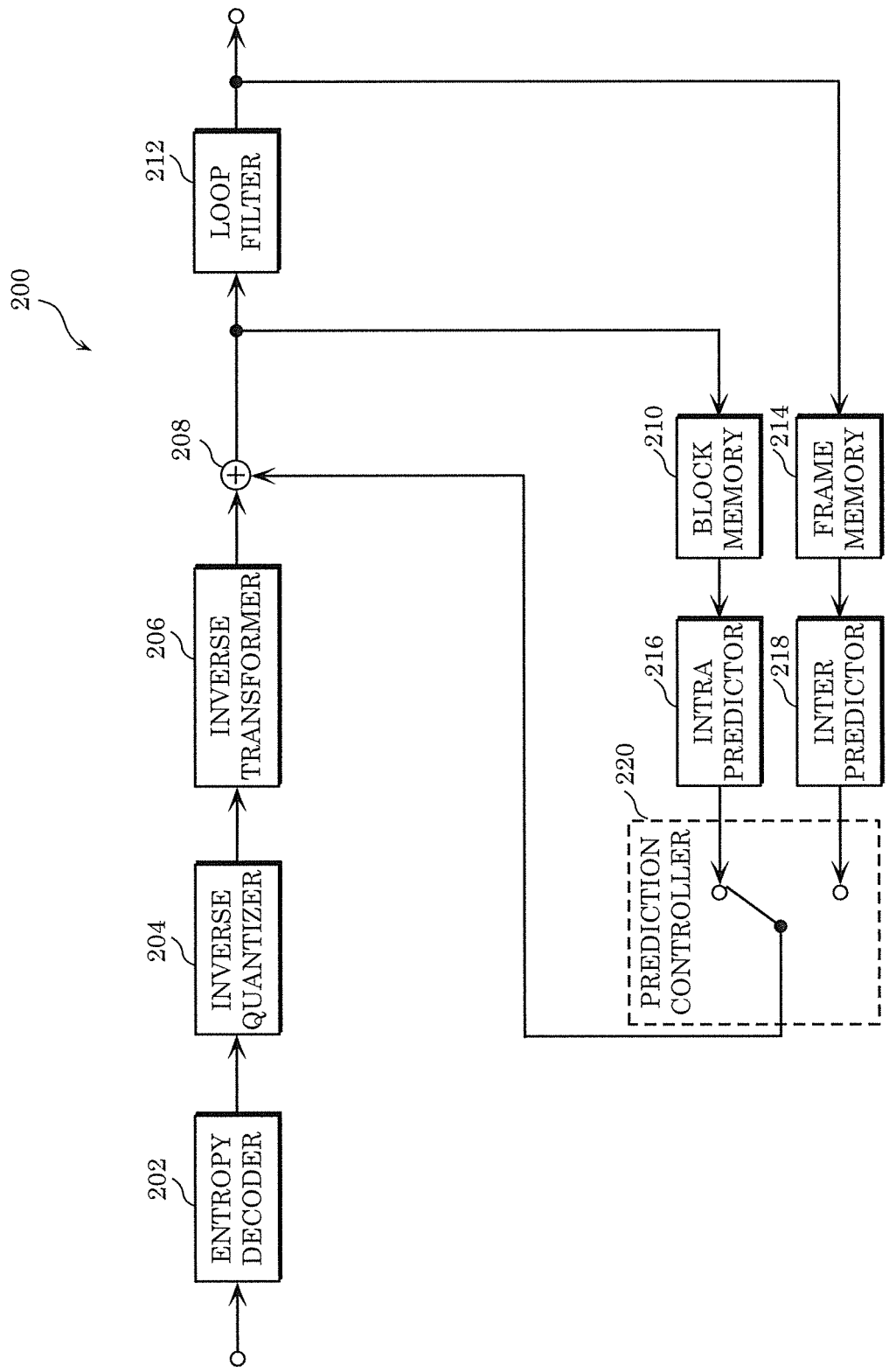
FIG. 10 is a block diagram illustrating a functional configuration of the decoding device according to Embodiment 1.

Next, a decoding device capable of decoding an encoded signal (encoded bitstream) output from encoding device 100 will be described. FIG. 10 is a block diagram illustrating a functional configuration of decoding device 200 according to Embodiment 1. Decoding device 200 is a moving picture/picture decoding device that decodes a moving picture/picture block by block.

As illustrated in FIG. 10, decoding device 200 includes entropy decoder 202, inverse quantizer 204, inverse transformer 206, adder 208, block memory 210, loop filter 212, frame memory 214, intra predictor 216, inter predictor 218, and prediction controller 220.

Decoding device 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoding device 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoding device 200 will be described.
(Entropy Decoder)

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.
(Inverse Quantizer)

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.
(Inverse Transformer)

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients (transform results).
(Adder)

Adder 208 reconstructs the current block by summing prediction errors, which are inputs from inverse transformer 206, and prediction signals, which is an input from prediction controller 220. Adder 208 then outputs the reconstructed block to block memory 210 and loop filter 212.
(Block Memory)

Block memory 210 is storage for storing blocks in a picture to be decoded (hereinafter referred to as a current picture) for reference in intra prediction. More specifically, block memory 210 stores reconstructed blocks output from adder 208.
(Loop Filter)

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

(Frame Memory)

Frame memory 214 is storage for storing reference pictures used in inter prediction, and is also referred to as a frame buffer. More specifically, frame memory 214 stores reconstructed blocks filtered by loop filter 212.

(Intra Predictor)

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

(Inter Predictor)

Inter predictor 218 predicts the current block with reference to a reference picture stored in frame memory 214. Inter prediction is performed per current block or per sub-block (for example, per 4×4 block) in the current block. For example, inter predictor 126 generates an inter prediction signal of the current block or sub-block by motion compensation by using motion information (for example, a motion vector) parsed from an encoded bitstream, and outputs the inter prediction signal to prediction controller 128.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

(Prediction Controller)

Prediction controller 220 selects either the intra prediction signal or the inter prediction signal, and outputs the selected prediction signal to adder 208.

Next, signal dependent adaptive quantization/inverse quantization performed in encoding device 100 and decoding device 200 configured as described above are described with reference to the drawings.

[Signal Dependent Adaptive Quantization/Inverse Quantization Processing in an Encoder]

Figure 11:
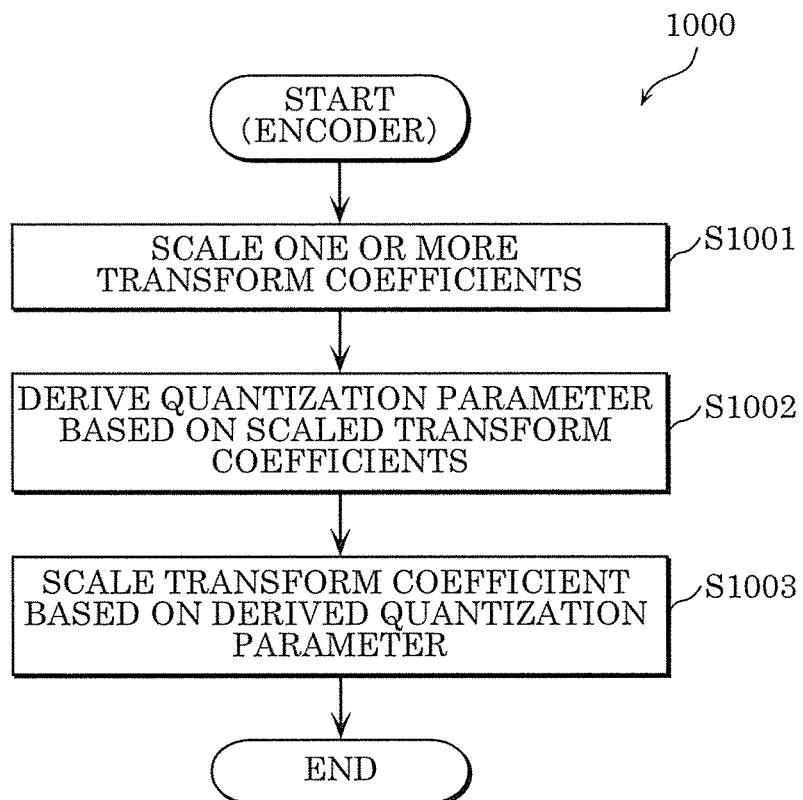
FIG. 11 is a flowchart indicating signal dependent adaptive quantization/inverse quantization processing in an encoder according to Embodiment 1.

FIG. 11 is a flowchart indicating signal dependent adaptive quantization/inverse quantization processing in encoder 100 according to Embodiment 1. Signal dependent adaptive quantization/inverse quantization processing 1000 illustrated in FIG. 11 are mainly performed by encoder 100 and inverse quantizer 112 illustrated in FIG. 1.

First, in Step S1001, one or more quantized transform coefficients (first transform coefficients) are scaled. This scaling processing is inverse quantization processing. In other words, in Step S1001, the one or more quantized coefficients are inverse-quantized by a pre-defined quantization parameter.

In Step S1002, a new quantization parameter is derived based on the transform coefficients scaled in Step S1001. In general, such a newly derived quantization parameter has a value larger than the value of the pre-defined quantization parameter. Examples of relationships between a quantization parameter and a transform coefficient scaled based on the quantization parameter include a linear function and a non-linear function (for example, a power function).

In a variation of this embodiment, the relationship between a quantization parameter to be derived and a transform coefficient (first transform coefficient) to be used to derive the quantization parameter is adjustable by one or more strength parameters. In addition, in another variation of this embodiment, a plurality of mapping functions switchable by one or more selection parameters are used to derive a quantization parameter. The plurality of mapping functions are mutually different functions for deriving a quantization parameter from transform coefficients. Furthermore, in still another variation of the embodiment, a strength parameter or a selection parameter is determined based on a quantization parameter of an image block (for example, a strength parameter having a large value is obtained from a quantization parameter having a large value, and a switch parameter having a different value is obtained from a quantization parameter having a different value).

Lastly, in Step S1003, a quantized transform coefficient (second transform coefficient) is scaled based on the quantization parameter newly derived in Step S1002.

The one or more transform coefficients (first transform coefficient(s)) in Step S1003 and the transform coefficient (second transform coefficient) in Step S1001 belong to the same image block. In addition, these transform coefficients may belong to the same colour component, or may belong to different colour components. For example, the transform coefficient in Step S1001 may be a transform coefficient of a luminance block, and the transform coefficient in Step S1003 may be a transform coefficient of a chrominance block. In a variation of this embodiment, all transform coefficients are of a single image block. In another variation of this embodiment, all transform coefficients are AC transform coefficients of a single image block. In still another variation of the embodiment, at least one transform coefficient is a DC coefficient of an image block.

Figure 28:
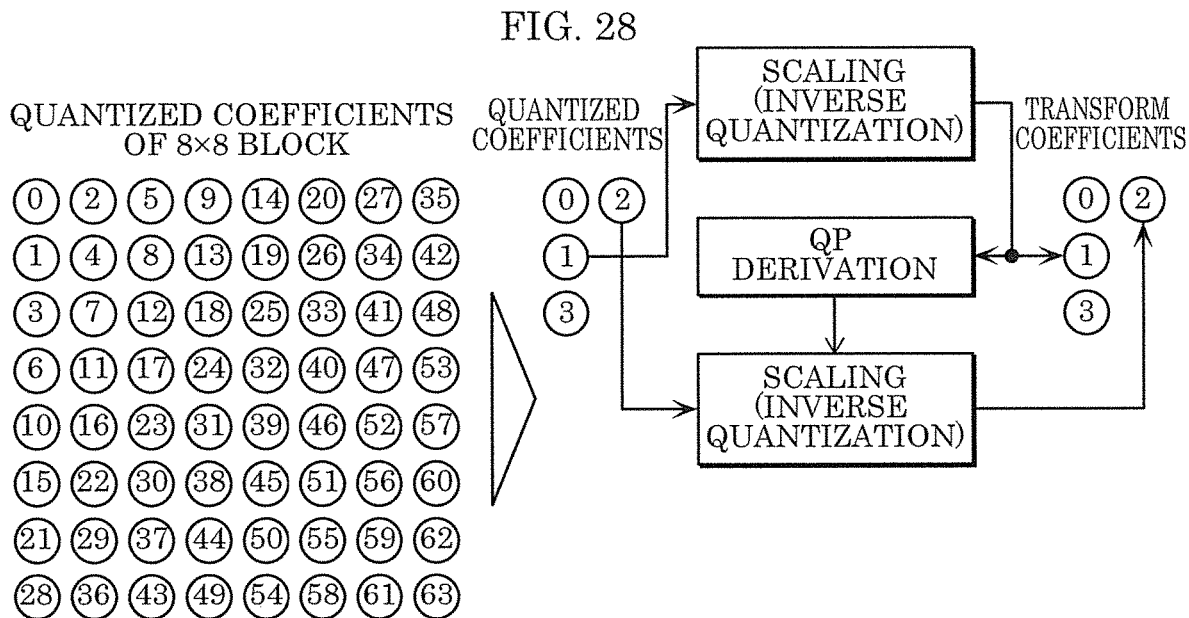
FIG. 28 is a diagram indicating an example of inverse quantization of transform coefficients of a block having an 8×8 image size.

FIG. 28 illustrates an example of inverse quantization of transform coefficients of a block having an 8×8 image size. Each of circles in FIG. 28 illustrates a coefficient. The quantized transform coefficients (quantized coefficients) are scaled (inverse-transformed) according to a pre-defined scanning order. In FIG. 28, the numeral in each of the circles indicates a rank order in the pre-defined scanning order. Here, the pre-defined scanning order is defined in an ascending order of frequency. As illustrated in FIG. 28, the transform coefficients which have been inverse-quantized earlier in the pre-defined scanning order are used to derive the quantization parameter for quantization/inverse quantization of a following transform coefficient in the pre-defined scanning order.

More specifically, in FIG. 28, the quantization coefficient (0) of a DC component which has been inverse-quantized first is inverse-quantized based on a first pre-defined quantization parameter. Subsequently, a quantization coefficient (1) of an AC component which has been inverse-quantized in the second rank order is inverse-quantized based on a second pre-defined quantization parameter. The second pre-defined quantization parameter may be the same as the first quantization parameter, or may be larger than a first quantization parameter.

Next, a quantization parameter for a quantized coefficient (2) to be inverse-quantized next is derived based on the transform coefficient (1) of the AC component obtained by the inverse quantization of the quantized coefficient (1). The quantized coefficient (2) of the AC component to be inverse-quantized in the third rank order is inverse-quantized based on the quantization parameter derived from the transform coefficient (1) to obtain a transform coefficient (2).

It is to be noted that the quantization parameter for a current transform coefficient to be quantized/inverse-quantized (hereinafter, referred to as a current coefficient) may be derived according to a cumulative sum of transform coefficients which precede the current coefficient in the pre-defined scanning order. For example, the quantization parameter for quantization/inverse quantization of a 16th current coefficient in the pre-defined scanning order may be derived based on the cumulative sum of the 1st to 15th transform coefficients. At this time, the number of quantization parameters may increase with increase in cumulative sum of transform coefficients. In this way, it is possible to increase a quantization step in quantization/inverse quantization for transform coefficients in a high frequency region compared to those in a low frequency region.

It is to be noted that a DC coefficient (for example, a first transform coefficient) may be excluded from the cumulative sum of such transform coefficients. In other words, the quantization parameter for the current coefficient may be derived based on the cumulative sum of the AC transform coefficients preceding the current coefficient (for example, the transform coefficients starting with the second transform coefficient).

In addition, the transform coefficients in the low frequency region may be excluded from the cumulative sum of the transform coefficients. In other words, the quantization parameter for the current coefficient may be a transform coefficient that precedes the current coefficient, and may be derived based on the cumulative sum of the transform coefficients at and after a threshold rank order. For example, the quantization parameter for quantization/inverse quantization of the 16th current coefficient in the pre-defined scanning order may be derived based on the cumulative sum of the 1st to 15th transform coefficients.

The threshold rank order may be defined in advance by a standard. In addition, the threshold rank order may be adaptively determined based on a sequence, a picture, a block, or the like. In this case, the threshold rank order may be signalled at, for example, a sequence, a picture, or a block level.

[Details of an Inverse Quantizer of the Encoder]

Figure 19:
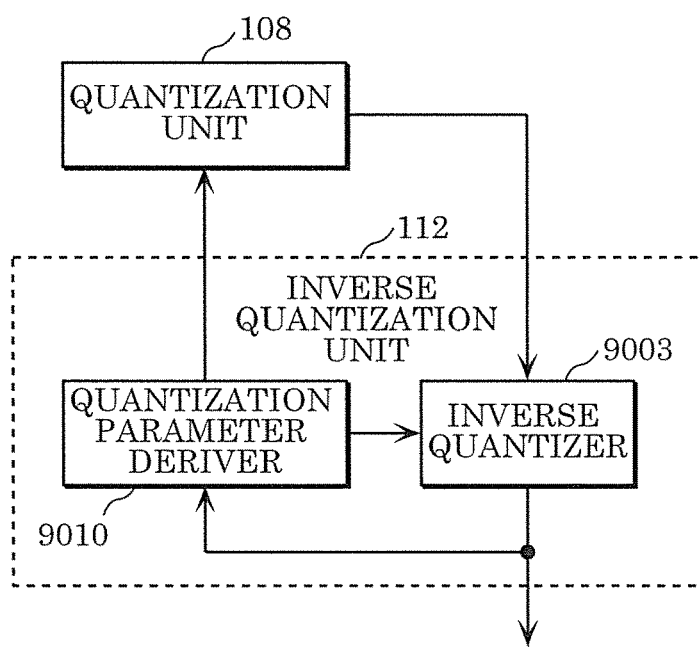
FIG. 19 is a block diagram indicating a detailed functional structure of an inverse quantizer in the encoder according to Embodiment 1.

FIG. 19 is a block diagram indicating a detailed functional structure of inverse quantizer 112 in encoder 100 according to Embodiment 1.

Quantizer 108 quantizes transform coefficients which have been input from transformer 106, based on the pre-defined quantization parameter or the quantization parameter which has been input from inverse quantizer 112. Subsequently, quantizer 108 outputs transform coefficients which have been quantized (quantized transform coefficients) to inverse quantizer 112 and entropy encoder 110.

Inverse quantizer 112 inverse-quantizes the transform coefficients quantized by quantizer 108. Subsequently, inverse quantizer 112 outputs inverse-quantized transform coefficients to inverse transformer 114. As illustrated in FIG. 19, inverse quantizer 112 includes inverse quantizer 9003 and quantization parameter deriver 9010.

Inverse quantizer 9003 inverse-quantizes the transform coefficients quantized by quantizer 108, based on the pre-defined quantization parameter or the quantization parameter derived by quantization parameter deriver 9010, and outputs the inverse-quantized transform coefficients to inverse transformer 114 and quantization parameter deriver 9010.

Quantization parameter deriver 9010 derives a new quantization parameter for transform coefficients to be quantized/inverse-quantized next, based on the inverse-quantized transform coefficients which have been input from inverse quantizer 9003. Subsequently, quantization parameter deriver 9010 outputs the derived new quantization parameter to quantizer 108 and inverse quantizer 9003.

[Signal Dependent Adaptive Inverse Quantization Processing in a Decoder]

Figure 12:
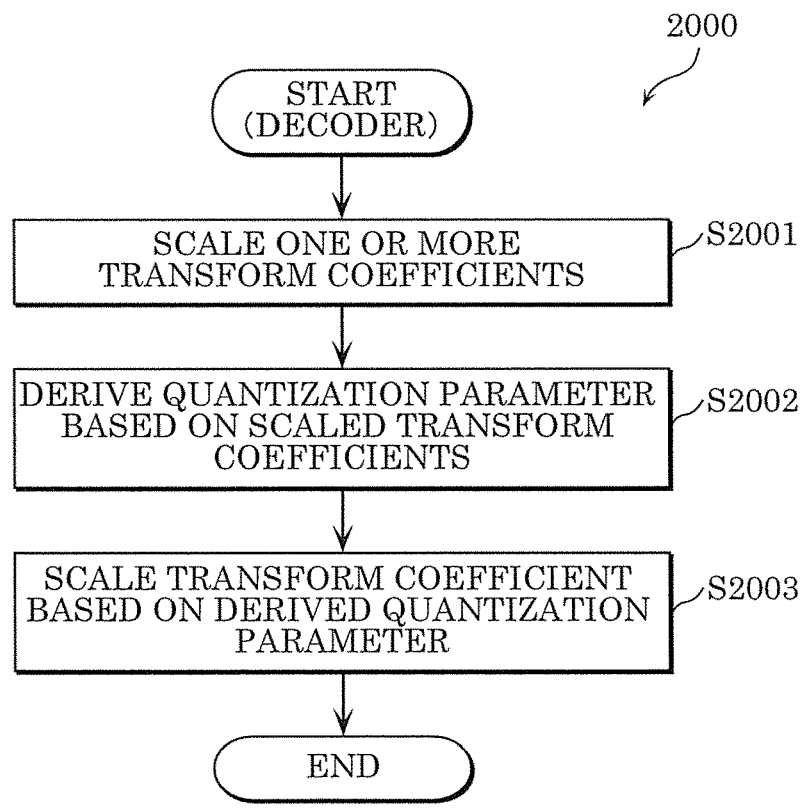
FIG. 12 is a flowchart indicating signal dependent adaptive inverse quantization processing in a decoder according to Embodiment 1.

FIG. 12 is a flowchart indicating signal dependent adaptive inverse quantization processing 2000 in decoder 200 according to Embodiment 1. Signal dependent adaptive inverse quantization processing 2000 illustrated in FIG. 12 is mainly performed by inverse quantizer 204 of decoder 200 illustrated in FIG. 10.

First, in Step S2001, one or more quantized transform coefficients (first transform coefficients) are scaled. This scaling processing is inverse quantization processing. In other words, in Step S2001, the quantized coefficients are inverse-quantized by a pre-defined quantization parameter.

In Step S2002, a new quantization parameter is derived based on the transform coefficients scaled in Step S2001. In general, such a newly derived quantization parameter has a value larger than the value of the pre-defined quantization parameter. Examples of relationships between a quantization parameter and a transform coefficient scaled based on the quantization parameter include a linear function and a non-linear function (for example, a power function).

In a variation of this embodiment, the relationship between a quantization parameter to be derived and a transform coefficient to be used to derive the quantization parameter is adjustable by one or more strength parameters. In addition, in another variation of this embodiment, a plurality of mapping functions switchable by one or more selection parameters are used to derive a quantization parameter. The plurality of mapping functions are mutually different functions for deriving a quantization parameter from transform coefficients. Furthermore, in still another variation of the embodiment, a strength parameter or a selection parameter is determined based on a quantization parameter of an image block (for example, a strength parameter having a large value is obtained from a quantization parameter having a large value, and a switch parameter having a different value is obtained from a quantization parameter having a different value).

Lastly, in Step S2003, the quantized transform coefficient (second transform coefficient) is scaled based on the quantization parameter which has been newly derived in Step S2002.

The transform coefficient in Step S2003 and the transform coefficient in Step S2001 belong to the same image block. In addition, these transform coefficients may belong to the same colour component, or may belong to different colour components. For example, the transform coefficient in Step S2001 may be a transform coefficient of a luminance block, and the transform coefficient in Step S2003 may be a transform coefficient of a chrominance block. In a variation of this embodiment, all transform coefficients are of a single image block. In another variation of this embodiment, all transform coefficients are AC transform coefficients of a single image block. In still another variation of the embodiment, at least one transform coefficient is a DC coefficient of an image block.

[Details of Inverse Quantizer of the Decoder]

Figure 20:
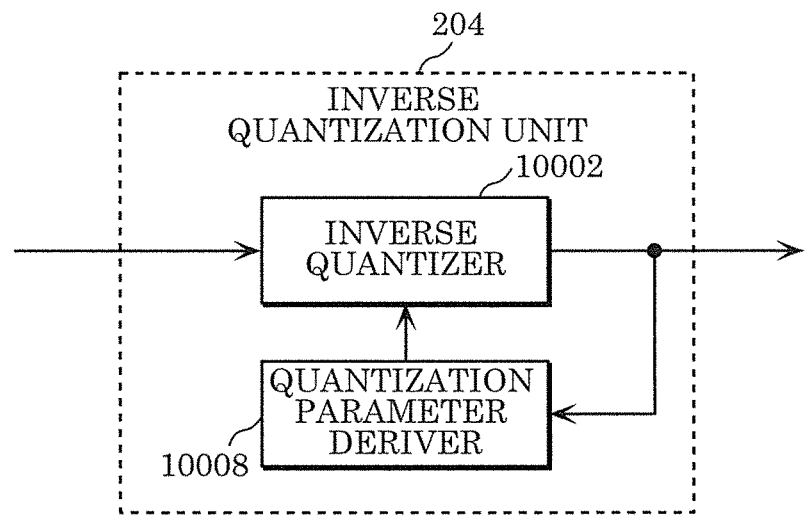
FIG. 20 is a block diagram indicating a detailed functional structure of an inverse quantizer in the decoder according to Embodiment 1.

FIG. 20 is a block diagram indicating a detailed functional structure of inverse quantizer 204 in decoder 200 according to Embodiment 1.

Inverse quantizer 204 inverse-quantizes transform coefficients (quantized coefficients) of a current block that is an input from entropy decoder 202. Subsequently, inverse quantizer 204 outputs inverse-quantized transform coefficients to inverse transformer 206. As illustrated in FIG. 20, inverse quantizer 204 includes: inverse quantizer 10002; and quantization parameter deriver 10008.

Inverse quantizer 10002 inverse-quantizes the quantized coefficients decoded by entropy decoder 202, based on the pre-defined quantization parameter or the quantization parameter derived by quantization parameter deriver 10008, and outputs the transform coefficients to inverse transformer 206 and quantization parameter deriver 10008.

Quantization parameter deriver 10008 derives a quantization parameter for a transform coefficient to be inverse-quantized next, based on the transform coefficient that is an input from inverse quantizer 9003, and outputs the derived quantization parameter to inverse quantizer 10002.

As described above, encoder 100 and decoder 200 according to this embodiment inverse-quantizes the one or more first transform coefficients, derives a quantization parameter based on the one or more first transform coefficients which have been inverse-quantized, and inverse-quantizes the quantized second transform coefficient based on the derived quantization parameter.

In this way, it is possible to derive the quantization parameter to be used to inverse-quantize the quantized second transform coefficient, based on the one or more first transform coefficients which have been inverse-quantized previously. In other words, the quantization parameters can be adaptively derived in units of a coefficient. Through the inverse quantization of the quantized transform coefficients based on the quantization parameter derived adaptively in units of a coefficient, it is possible to enhance subjective image quality. Furthermore, since it is possible to derive the quantization parameter based on the one or more first transform coefficients which have been inverse-quantized previously, it is possible to reduce increase in the number of signal bits for deriving the quantization parameter, and increase coding efficiency.

Variation 1 of Embodiment 1

Next, Variation 1 of Embodiment 1 is described. This variation differs from Embodiment 1 in that a quantization parameter is derived based on a transform coefficient which has been inverse-quantized previously and a transform coefficient transformed from a prediction signal of a current block. Hereinafter, the variation is described mainly focused on differences from Embodiment 1.

[Signal Dependent Adaptive Quantization/Inverse Quantization Processing in an Encoder]

Figure 13:
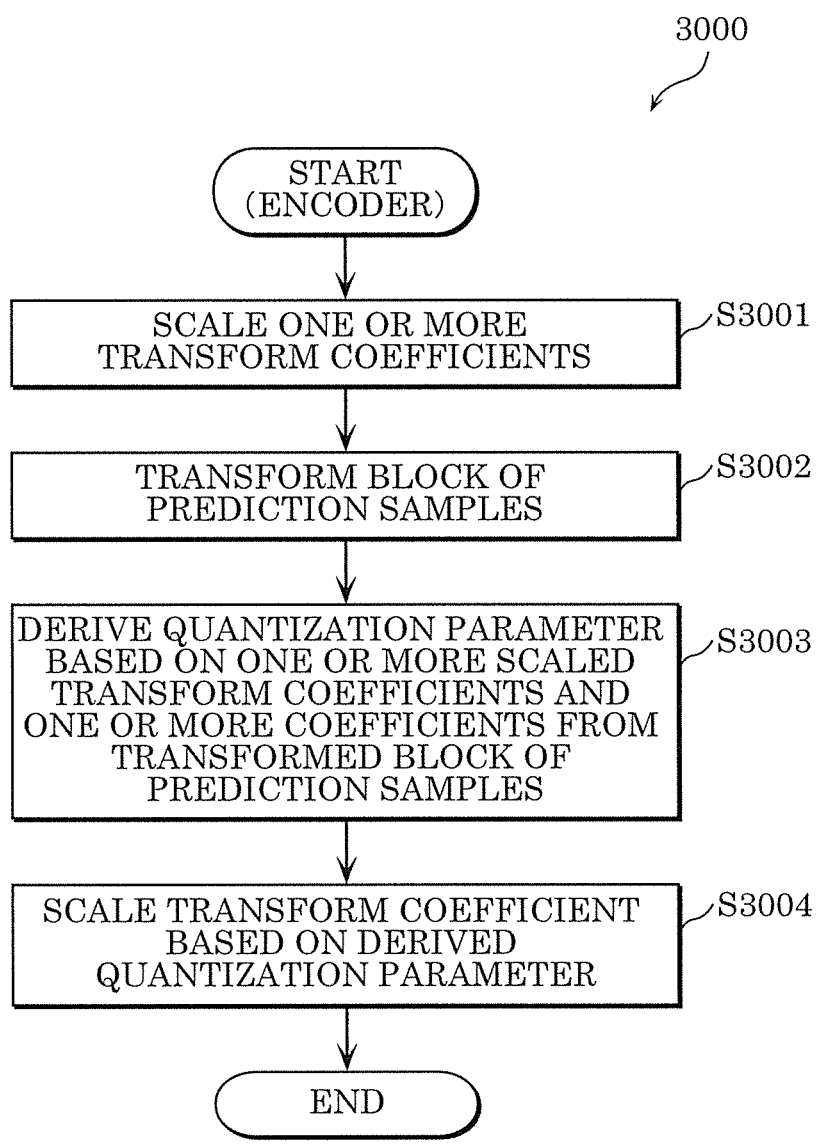
FIG. 13 is a flowchart indicating signal dependent adaptive quantization/inverse quantization processing in an encoder according to Variation 1 of Embodiment 1.

FIG. 13 is a flowchart indicating signal dependent adaptive quantization/inverse quantization processing in encoder 100 according to Variation 1 of Embodiment 1. Signal dependent adaptive quantization/inverse quantization processing 3000 illustrated in FIG. 13 is mainly performed by inverse quantizer 112A (FIG. 21) to be described later.

First, in Step S3001, one or more quantized transform coefficients (first transform coefficients) are scaled.

In Step S3002, a block of prediction samples is transformed into transform coefficients (third transform coefficients). In other words, a prediction signal of the current block is frequency transformed into transform coefficients.

In Step S3003, a new quantization parameter is derived based on the one or more transform coefficients scaled in Step S3001 and the transform coefficients transformed from the block of the prediction sample in Step S3002.

The derivation of the quantization parameter may involve a process for adding one of the one or more transform coefficients scaled in Step S3001 and one of the plurality of transform coefficients transformed from the block of the prediction sample in Step S3002. As another example of the derivation of the quantization parameter, there is a method for deriving a quantization parameter based on a distribution of a plurality of transform coefficients transformed from a block of prediction samples. In the deriving in Step S3003, both a cumulative sum of the plurality of transform coefficients transformed from the block of prediction samples and a distribution of the plurality of transform coefficients may be used to determine a new quantization parameter.

Lastly, in Step S3004, the quantized transform coefficient (second transform coefficient) is scaled based on the quantization parameter which has been newly derived in Step S3003.

[Details of an Inverse Quantizer of the Encoder]

Figure 21:
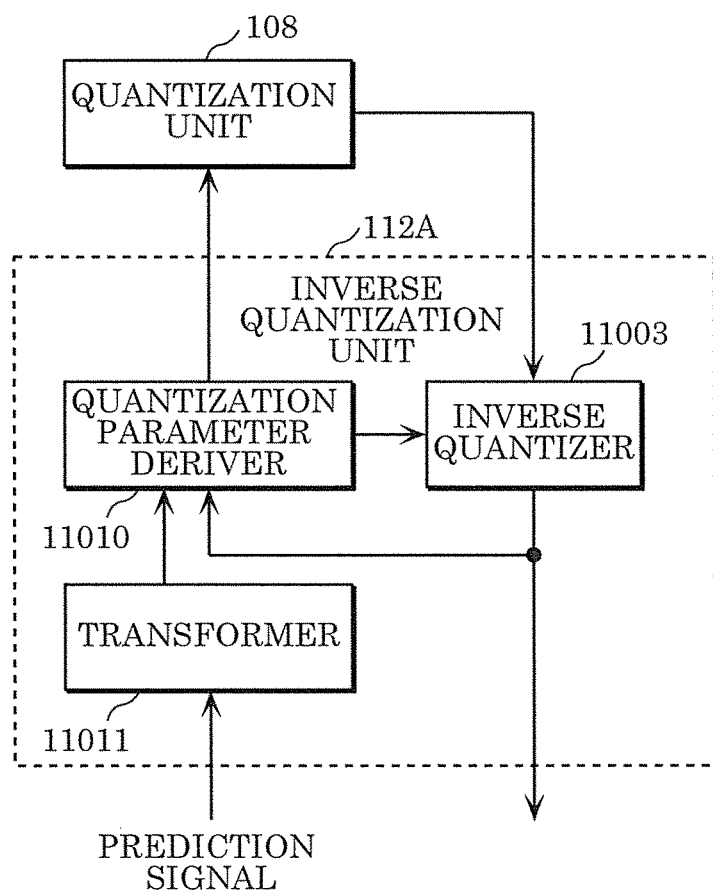
FIG. 21 is a block diagram indicating a detailed functional structure of an inverse quantizer in the encoder according to Variation 1 of Embodiment 1.

FIG. 21 is a block diagram indicating a detailed functional structure of inverse quantizer 112A in encoder 100 according to Variation 1 of Embodiment 1. In this variation, inverse quantizer 112A is included in encoder 100 instead of inverse quantizer 112 in FIG. 1.

As illustrated in FIG. 21, inverse quantizer 112A includes: inverse quantizer 11003; quantization parameter deriver 11010; and transformer 11011. Inverse quantizer 11003 inverse-quantizes a transform coefficient quantized by quantizer 108, based on a pre-defined quantization parameter or the quantization parameter derived by quantization parameter deriver 11010. Subsequently, inverse quantizer 11003 outputs inverse-quantized transform coefficients to inverse transformer 114 and quantization parameter deriver 11010.

Quantization parameter deriver 11010 derives a new quantization parameter for transform coefficients to be quantized/inverse-quantized next, based on the inverse-quantized transform coefficients which have been input from inverse quantizer 11003 and the transform coefficients which have been input from transformer 11011. Subsequently, quantization parameter deriver 11010 outputs the derived new quantization parameter to inverse quantizer 11003.

Transformer 11011 transforms the prediction samples of the current block which has been input from prediction controller 128 into transform coefficients of a frequency domain. Subsequently, transformer 11011 outputs the transform coefficients to quantization parameter deriver 11010.

[Signal Dependent Adaptive Inverse Quantization Processing in a Decoder]

Figure 14:
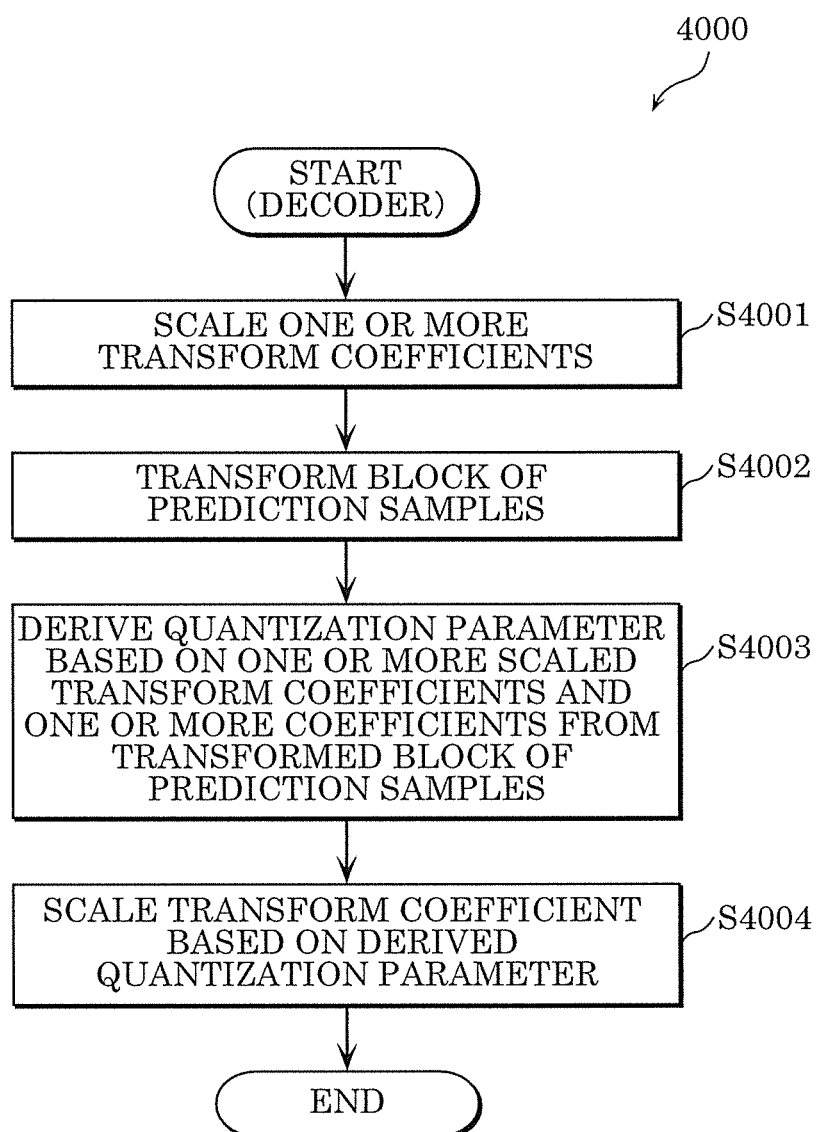
FIG. 14 is a flowchart indicating signal dependent adaptive inverse quantization processing in a decoder according to Variation 1 of Embodiment 1.

FIG. 14 is a flowchart indicating signal dependent adaptive inverse quantization processing 4000 in decoder 200 according to Variation 1 of Embodiment 1. Signal dependent adaptive inverse quantization processing 4000 illustrated in FIG. 14 is mainly performed by inverse quantizer 204A (FIG. 22) to be described later.

First, in Step S4001, one or more quantized transform coefficients (first transform coefficients) are scaled.

In Step S4002, a block of prediction samples is transformed into transform coefficients (third transform coefficients). In other words, a prediction signal of the current block is frequency-transformed into the transform coefficients.

In Step S4003, a new quantization parameter is derived based on the transform coefficients scaled in Step S4001 and the one or more transform coefficients transformed from the block of the prediction sample in Step S4002.

The derivation of the quantization parameter may involve a process for adding one of the one or more transform coefficients scaled in Step S4001 and one of the plurality of transform coefficients transformed from the block of the prediction sample in Step S4002. As another example of the derivation of the quantization parameter, there is a method for deriving a quantization parameter based on a distribution of a plurality of transform coefficients transformed from the block of prediction samples. In the deriving in Step S4003, both a cumulative sum of the plurality of transform coefficients transformed from the block of prediction samples and a distribution of the plurality of transform coefficients may be used to determine a new quantization parameter.

Lastly, in Step S4004, the quantized transform coefficient (second transform coefficient) is scaled based on the quantization parameter which has been newly derived in Step S4003.

[Details of Inverse Quantizer of the Decoder]

Figure 22:
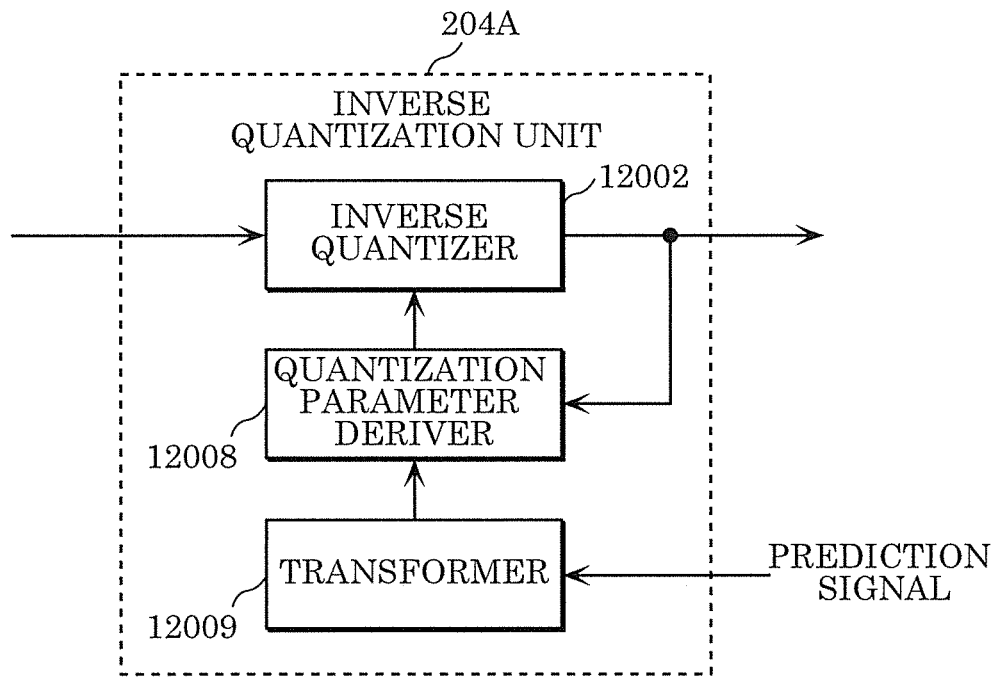
FIG. 22 is a block diagram indicating a detailed functional structure of an inverse quantizer in the decoder according to Variation 1 of Embodiment 1.

FIG. 22 is a block diagram indicating a detailed functional structure of inverse quantizer 204A in decoder 200 according to Variation 1 of Embodiment 1. In this variation, inverse quantizer 204A is included in decoder 200 instead of inverse quantizer 204 in FIG. 10.

As illustrated in FIG. 22, inverse quantizer 204A includes: inverse quantizer 12002; quantization parameter deriver 12008; and transformer 12009. Inverse quantizer 12002 inverse-quantizes the quantized coefficients decoded by entropy decoder 202, based on the pre-defined quantization parameter or the quantization parameter derived by quantization parameter deriver 12008, and outputs the transform coefficients to inverse transformer 206 and quantization parameter deriver 12008.

Quantization parameter deriver 12008 derives a quantization parameter based on the transform coefficients which are input from inverse quantizer 12002 and the transform coefficients which are input from transformer 12009, and outputs the derived quantization parameter.

Transformer 12009 transforms the prediction samples of the current block which has been input from prediction controller 220 into transform coefficients of a frequency domain. Subsequently, transformer 12009 outputs the transform coefficients to parameter deriver 12008.

As described above, encoder 100 and decoder 200 according to this variation further transform the prediction signal of the current block to be encoded into the one or more third transform coefficients, and derives the quantization parameter based on the one or more first transform coefficients which have been inverse-quantized and the one or more third transform coefficients transformed from the prediction signal of the current block to be encoded.

In this way, it is possible to derive the quantization parameter to be used to inverse-quantize the quantized second transform coefficient, based on the one or more third transform coefficients which have been transformed from the prediction signal of the current block to be encoded. Accordingly, it is also possible to derive more appropriate quantization parameter, which enables enhancement of subjective image quality and increase in coding efficiency.

Variation 2 of Embodiment 1

Next, Variation 2 of Embodiment 1 is described. This variation differs from Embodiment 1 in that a quantization parameter is derived based on a transform coefficient which has been inverse-quantized previously and an activity measure determined from a prediction signal of a current block. Hereinafter, the variation is described mainly focused on differences from Embodiment 1.

[Signal Dependent Adaptive Quantization/Inverse Quantization Processing in an Encoder]

Figure 15:
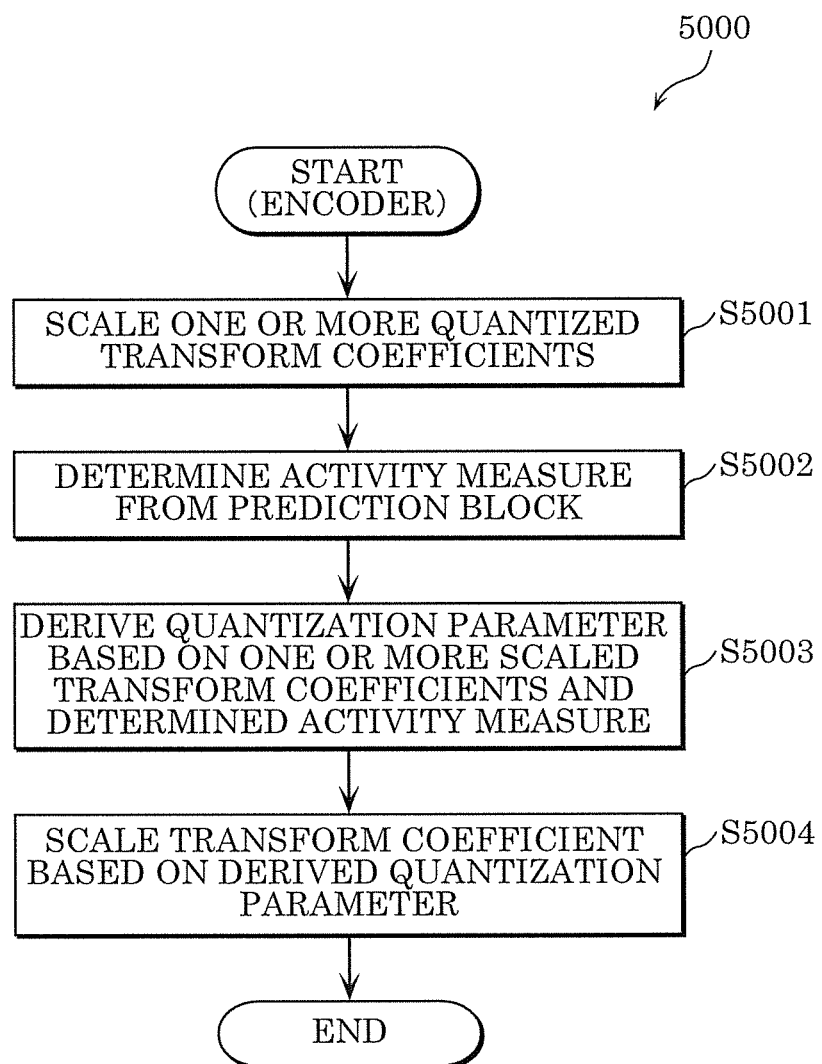
FIG. 15 is a flowchart indicating signal dependent adaptive quantization/inverse quantization processing in an encoder according to Variation 2 of Embodiment 1.

FIG. 15 is a flowchart indicating signal dependent adaptive quantization/inverse quantization processing 5000 in encoder 100 according to Variation 2 of Embodiment 1. Signal dependent adaptive quantization/inverse quantization processing 5000 illustrated in FIG. 15 is mainly performed by inverse quantizer 112B (FIG. 23) to be described later.

First, in Step S5001, one or more quantized transform coefficients (first transform coefficients) are scaled.

In Step S5002, an activity measure is determined from a prediction block (a prediction signal of a current block). This activity measure may be read out from a reference picture stored in frame memory 122, and may be calculated based on a prediction block using a computer. Examples of activity measures include a variance value of blocks and an edge strength obtainable by edge detection in a pre-defined direction (for example, in a horizontal, vertical, or orthogonal direction). Another exemplary activity measure is a signal (image) strength in a spatial or frequency domain. Based on this activity measure, prediction blocks are classified under different groups, and a quantization parameter based on the classification result is derived.

In Step S5003, a new quantization parameter is derived based on the transform coefficients scaled in Step S5001 and the activity measure determined in Step S5002.

In one variation of Step S5003, an activity measure is used to derive a quantization parameter when a prediction block is an inter prediction block.

When the prediction block is an intra prediction block, Step S5002 for determining an activity measure is skipped, and a new quantization parameter is derived based on transform coefficients scaled without being based on any activity measure.

Lastly, in Step S5004, the quantized transform coefficient (second transform coefficient) is scaled based on the quantization parameter which has been newly derived in Step S5003.

[Details of an Inverse Quantizer of the Encoder]

Figure 23:
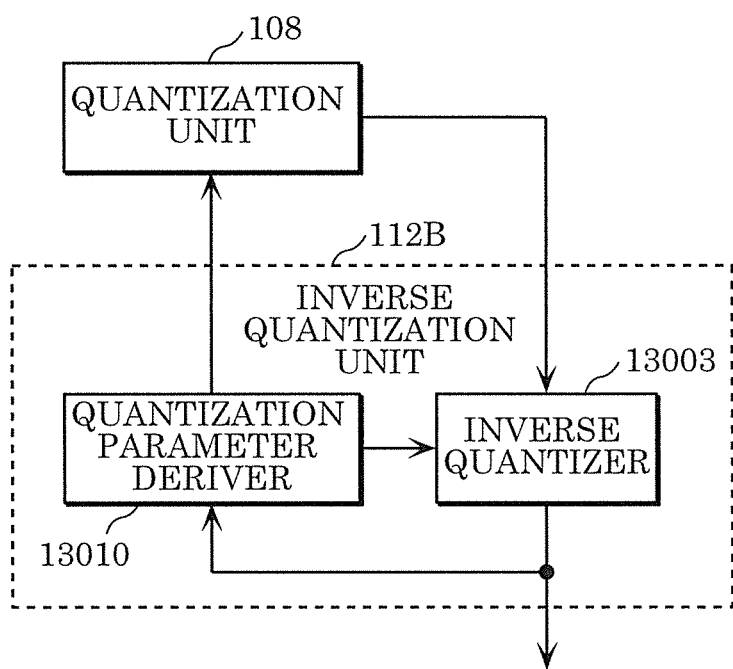
FIG. 23 is a block diagram indicating a detailed functional structure of an inverse quantizer in the encoder according to Variation 2 of Embodiment 1.

FIG. 23 is a block diagram indicating a detailed functional structure of inverse quantizer 112B in encoder 100 according to Variation 2 of Embodiment 1. In this variation, inverse quantizer 112B is included in encoder 100 instead of inverse quantizer 112 in FIG. 1.

As illustrated in FIG. 23, inverse quantizer 112B includes: inverse quantizer 13003; and quantization parameter deriver 13010. Inverse quantizer 13003 inverse-quantizes the transform coefficients quantized by quantizer 108, based on a pre-defined quantization parameter or the quantization parameter derived by quantization parameter deriver 13010. Subsequently, inverse quantizer 13003 outputs inverse-quantized transform coefficients to inverse transformer 114 and quantization parameter deriver 13010.

Quantization parameter deriver 13010 reads out the activity measure of the prediction block from frame memory 122. Subsequently, quantization parameter deriver 13010 derives a new quantization parameter for a transform coefficient to be quantized/inverse-quantized next, based on the transform coefficients inverse-quantized by inverse quantizer 11003 and the activity measure read out from frame memory 122. Subsequently, quantization parameter deriver 13010 outputs the derived new quantization parameter to inverse quantizer 13003.

[Signal Dependent Adaptive Inverse Quantization Processing in a Decoder]

Figure 16:
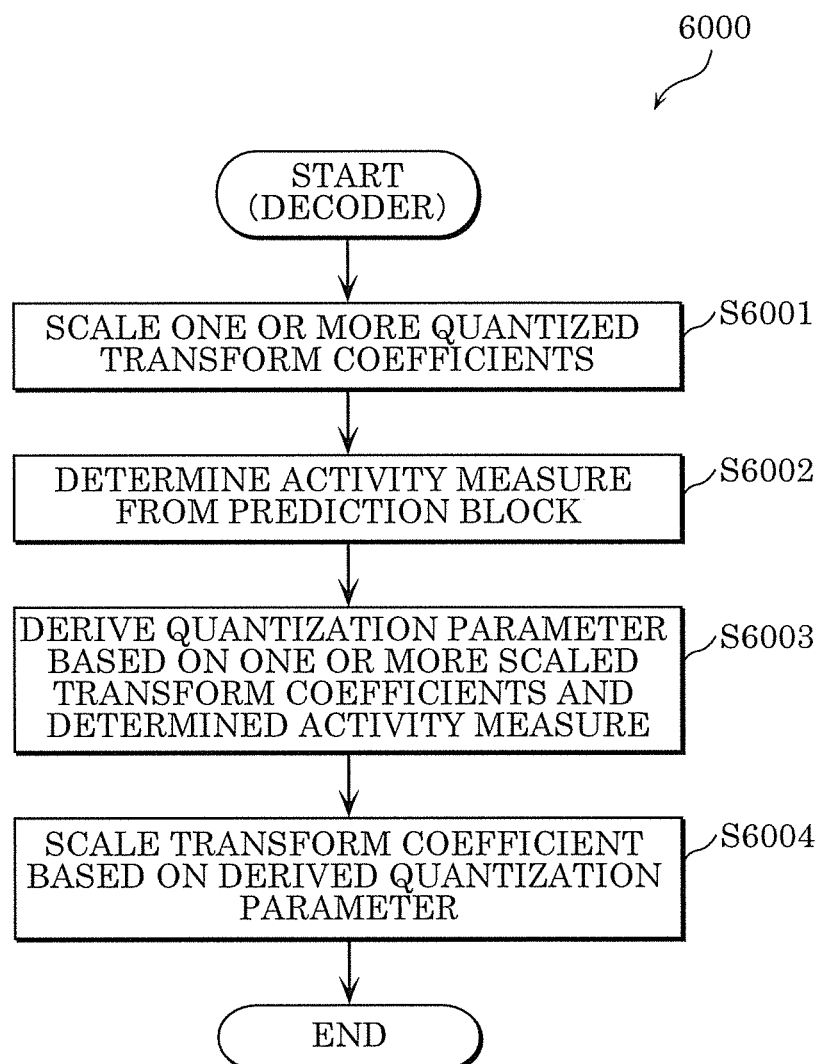
FIG. 16 is a flowchart indicating signal dependent adaptive inverse quantization processing in a decoder according to Variation 2 of Embodiment 1.

FIG. 16 is a flowchart indicating signal dependent adaptive inverse quantization processing 6000 in decoder 200 according to Variation 2 of Embodiment 1. Signal dependent adaptive inverse quantization processing 6000 illustrated in FIG. 16 is mainly performed by inverse quantizer 204B (FIG. 24) to be described later.

First, in Step S6001, one or more quantized transform coefficients (first transform coefficients) are scaled.

In Step S6002, an activity measure is determined from a prediction block. This activity measure may be read out from a reference picture stored in frame memory 214, and may be calculated based on a prediction block using a computer. Examples of activity measures include a variance value of blocks and an edge strength obtainable by edge detection in a pre-defined direction (for example, in a horizontal, vertical, or orthogonal direction). Another exemplary activity measure is a signal (image) strength in a spatial or frequency domain. Based on this activity measure, prediction blocks are classified under different groups, and a quantization parameter is derived based on the classification result.

In Step S6003, a new quantization parameter is derived based on the transform coefficients scaled in Step S6001 and the activity measure determined in Step S6002.

In one variation of Step S6003, an activity measure is used to derive a quantization parameter when a prediction block is an inter prediction block. When the prediction block is an intra prediction block, Step S6002 for determining an activity measure is skipped, and a new quantization parameter is derived based on transform coefficients scaled without being based on any activity measure in Step S6003.

Lastly, in Step S6004, the quantized transform coefficient (second transform coefficient) is scaled based on the quantization parameter which has been newly derived in Step S6003.

[Details of Inverse Quantizer of the Decoder]

Figure 24:
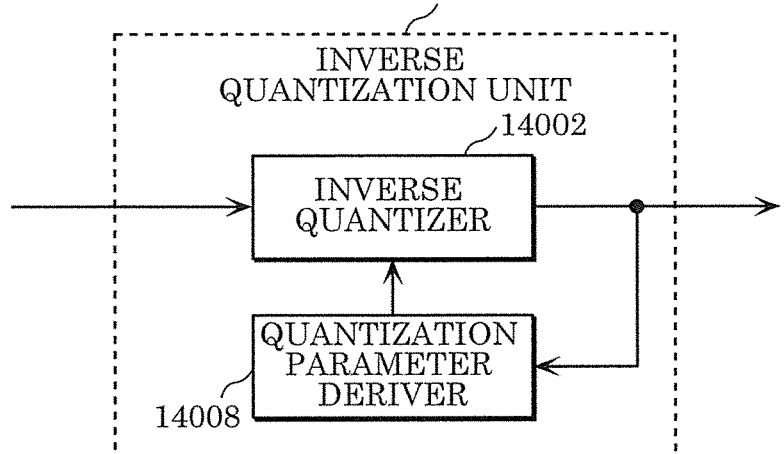
FIG. 24 is a block diagram indicating a detailed functional structure of an inverse quantizer in the decoder according to Variation 2 of Embodiment 1.

FIG. 24 is a block diagram indicating a detailed functional structure of inverse quantizer 204B in decoder 200 according to Variation 2 of Embodiment 1. In this variation, inverse quantizer 204B is included in decoder 200 instead of inverse quantizer 204 in FIG. 10.

As illustrated in FIG. 24, inverse quantizer 204B includes: inverse quantizer 14002; and quantization parameter deriver 14008. Inverse quantizer 14002 inverse-quantizes the quantized coefficients decoded by entropy decoder 202, based on the pre-defined quantization parameter or the quantization parameter derived by quantization parameter deriver 14008, and outputs the transform coefficients to inverse transformer 206 and quantization parameter deriver 14008.

Quantization parameter deriver 14008 reads out the activity measure of the prediction block from frame memory 214. Subsequently, quantization parameter deriver 14008 derives a new quantization parameter for a transform coefficient to be inverse-quantized next, based on the transform coefficient inverse-quantized by inverse quantizer 14002 and the activity measure read out from frame memory 214. Subsequently, quantization parameter deriver 14008 outputs the derived new quantization parameter to inverse quantizer 14002.

As described above, encoder 100 and decoder 200 according to this variation further determine the activity measure based on the prediction signal of the current block to be encoded, and derives the quantization parameter based on the one or more first transform coefficients which have been inverse quantized and the determined activity measure.

In this way, it is possible to derive the quantization parameter to be used to inverse-quantize the quantized second transform coefficient, based on the activity measure determined based on the prediction signal of the current block to be encoded. Accordingly, it is also possible to derive more appropriate quantization parameter, which enables enhancement of subjective image quality and increase in coding efficiency.

Variation 3 of Embodiment 1

Next, Variation 3 of Embodiment 1 is described. This variation differs from Embodiment 1 in that a quantization parameter is derived based on a transform coefficient which has been inverse-quantized previously and one or more control parameters encoded in an encoded bitstream. Hereinafter, the variation is described mainly focused on differences from Embodiment 1.

[Signal Dependent Adaptive Quantization/Inverse Quantization Processing in an Encoder]

Figure 17:
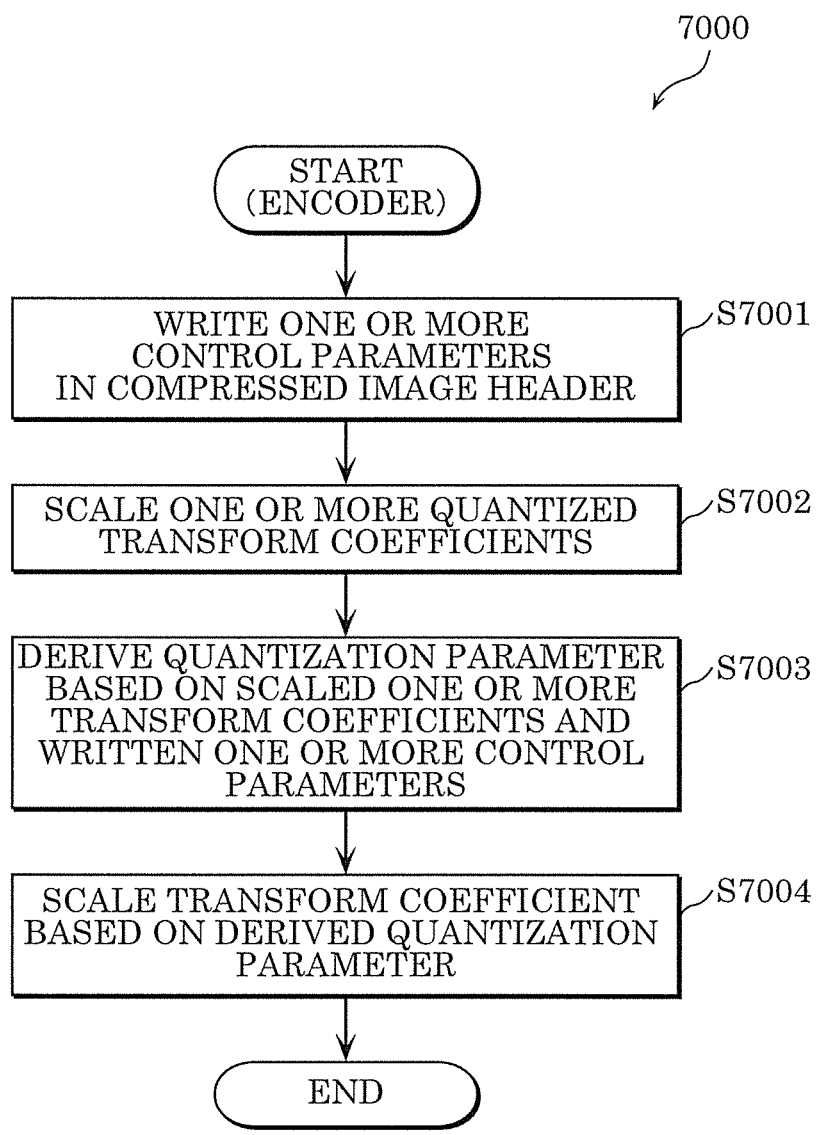
FIG. 17 is a flowchart indicating signal dependent adaptive quantization/inverse quantization processing in an encoder according to Variation 3 of Embodiment 1.

FIG. 17 is a flowchart indicating signal dependent adaptive quantization/inverse quantization processing 7000 in encoder 100 according to Variation 3 of Embodiment 1. Signal dependent adaptive quantization/inverse quantization processing 7000 illustrated in FIG. 17 is mainly performed by inverse quantizer 112C (FIG. 25) to be described later.

First, in Step S7001, one or more control parameters are written in a compressed image header (the header of the encoded bitstream). These control parameters may be strength parameters or switch parameters.

In next Step S7002, one or more quantized transform coefficients (first transform coefficients) are scaled.

In Step S7003, a new quantization parameter is derived based on the one or more control parameters written in Step S7001 and the transform coefficients scaled in Step S7002. In this variation, the relationship between the quantization parameter and the transform coefficients used to derive the quantization parameter is adjustable by the one or more strength parameters. In addition, in the deriving of the quantization parameter, a plurality of mapping functions switchable by one or more selection parameters may be used. In other words, the relationship between the transform coefficients and the quantization parameter is determined based on the one or more control parameters (one or more strength parameters or one or more selection parameters), and a quantization parameter is derived based on the determined relationship. For example, the relationship between the transform coefficients and the quantization parameter is represented according to a linear function, and when the one or more control parameters are one or more strength parameters, the tilt of the linear function is adjusted by the strength parameter, and a quantization parameter is derived from the transform coefficient using the adjusted tilt. In addition, for example, when the one or more control parameters are one or more selection parameters, one mapping function is selected from among a plurality of pre-defined mapping functions to map transform coefficients to quantization parameters, based on the one or more selection parameters, and a quantization parameter is derived from the transform coefficients using the selected mapping function.

Lastly, in Step S7004, the quantized transform coefficient (second transform coefficient) is scaled based on the quantization parameter which has been newly derived in Step S7003.

[Details of an Inverse Quantizer of the Encoder]

Figure 25:
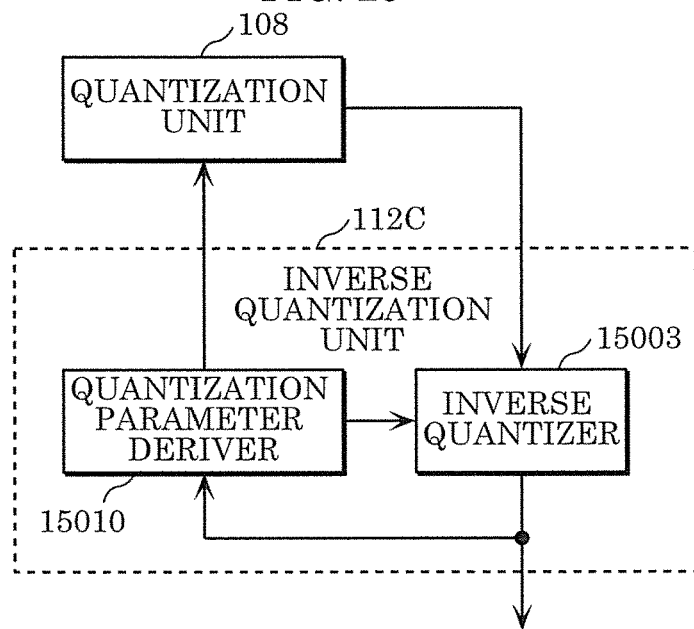
FIG. 25 is a block diagram indicating a detailed functional structure of an inverse quantizer in the encoder according to Variation 3 of Embodiment 1.

FIG. 25 is a block diagram indicating a detailed functional structure of inverse quantizer 112C in encoder 100 according to Variation 3 of Embodiment 1. In this variation, inverse quantizer 112C is included in encoder 100 instead of inverse quantizer 112C in FIG. 1.

As illustrated in FIG. 25, inverse quantizer 112C includes: inverse quantizer 15003; and quantization parameter deriver 15010. Inverse quantizer 15003 inverse-quantizes the transform coefficients quantized by quantizer 108, based on a pre-defined quantization parameter or the quantization parameter derived by quantization parameter deriver 15010. Subsequently, inverse quantizer 15003 outputs inverse-quantized transform coefficients to inverse transformer 114 and quantization parameter deriver 15010.

Quantization parameter deriver 15010 derives a new quantization parameter based on the transform coefficients inverse-quantized by inverse quantizer 15003 and the one or more control parameters for deriving the quantization parameter, and outputs the derived quantization parameter to inverse quantizer 15003. These control parameters may be strength parameters or selection parameters.

[Syntax]

Figure 27:
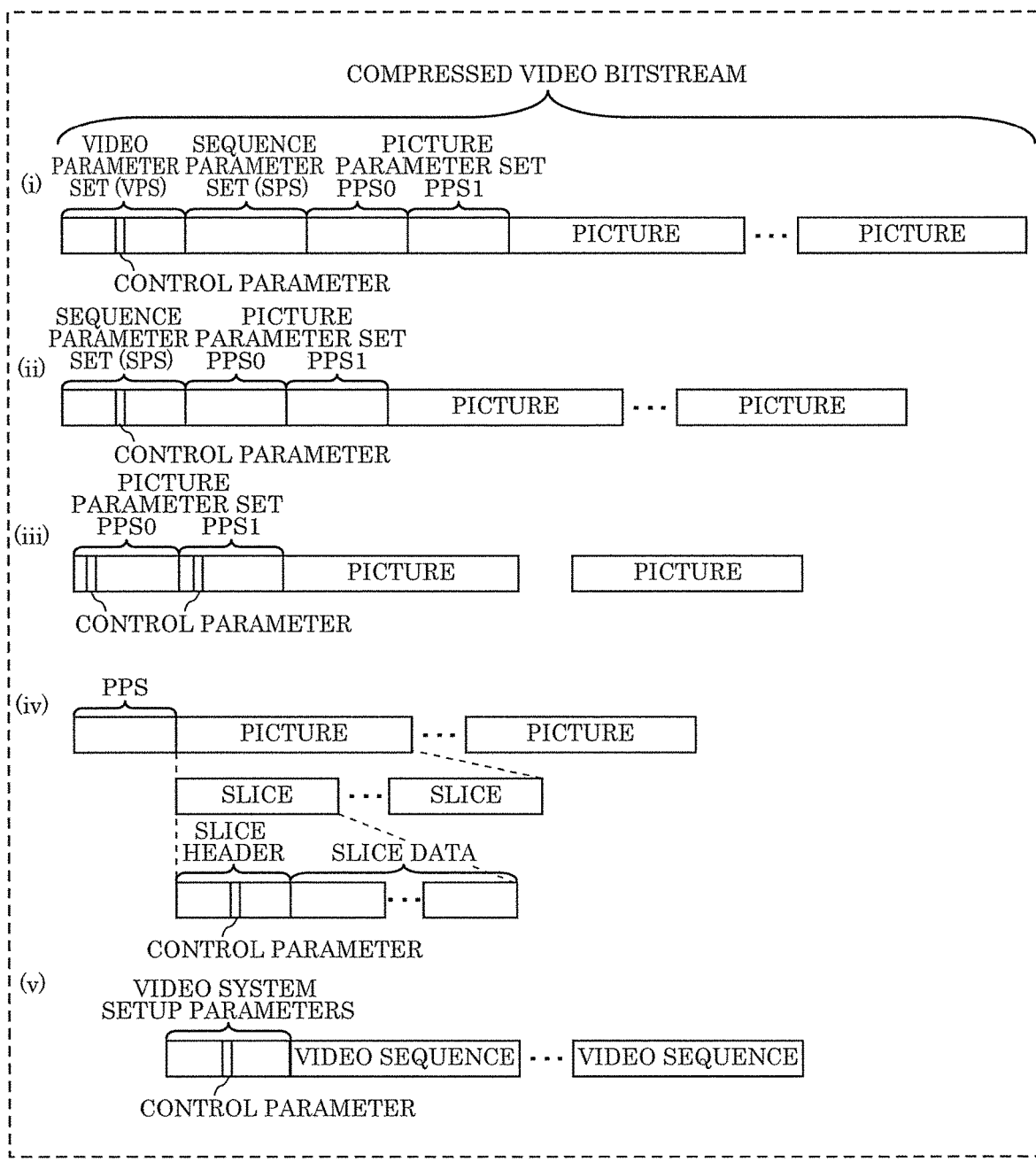
FIG. 27 is a diagram indicating examples of positions of control parameters in encoded video bitstreams.

FIG. 27 illustrates examples of positions of control parameters in encoded video streams (compressed video bitstreams). In FIG. 27, (i) illustrates one or more control parameters present in a video parameter set. In FIG. 27, (ii) illustrates one or more control parameters present in a sequence parameter set in a video stream. In FIG. 27, (iii) illustrates one or more control parameters present in a picture parameter set in a picture. In FIG. 27, (iv) illustrates one or more control parameters present in a slice header of a slice. In FIG. 27, (v) illustrates one or more control parameters included in a group of parameters for setting up or initializing a video system or a video decoder. When two control parameters are present in different hierarchical layers (for example, in a picture parameter set and in a slice header), the value of the control parameter in the lower hierarchical layer (for example, the slice header) overwrites the value of the control parameter in the higher hierarchical layer (for example, the picture parameter set).

Figure 29A:
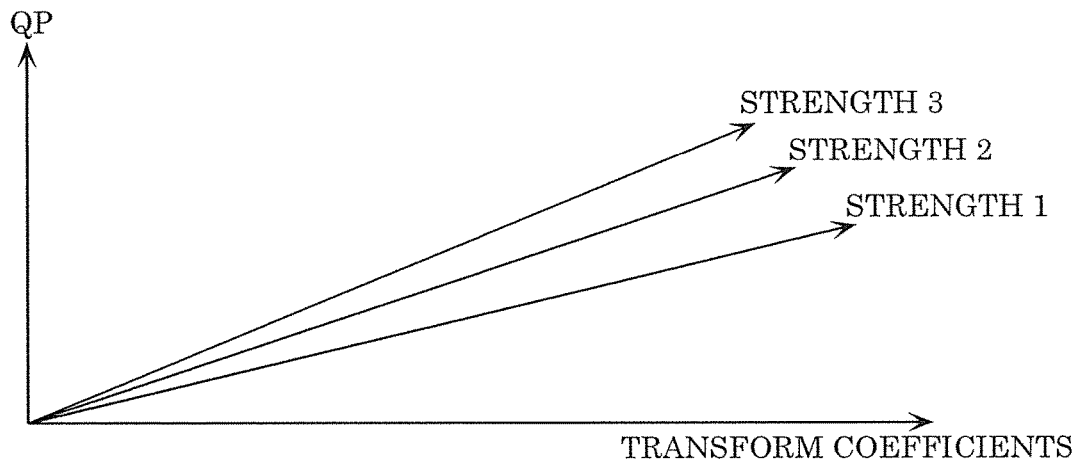
FIG. 29A is a diagram indicating examples of relationships between a transform coefficient and a quantization parameter each adjusted by one of strength parameters.

FIG. 29A is a diagram indicating examples of relationships between transform coefficients and a quantization parameter (QP) each adjusted by one of strength parameters. As illustrated in FIG. 29A, the tilt of the linear function is sharper when a strength parameter having a larger value is used as illustrated in FIG. 29A. In other words, when the strength parameter having the larger value is used, a quantization parameter having a larger value is obtained even when the transform value is the same.

Figure 29B:
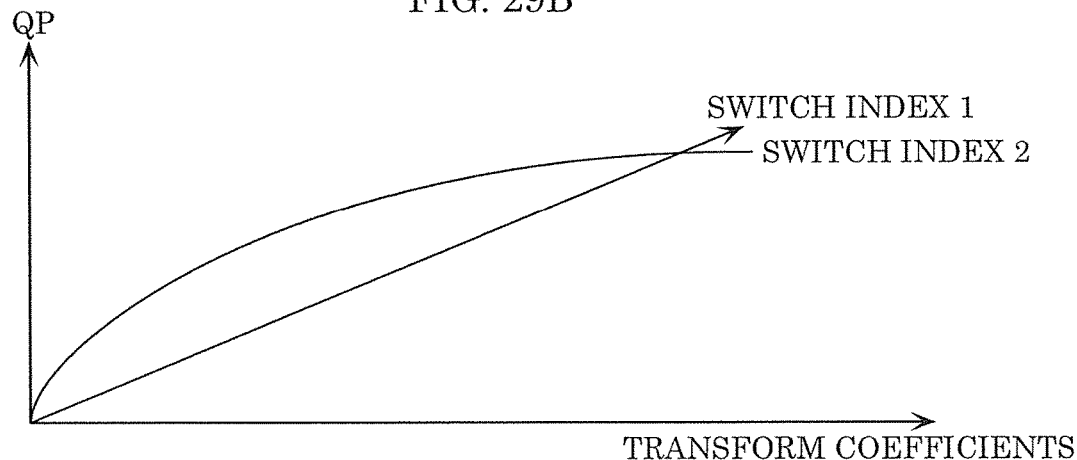
FIG. 29B is a diagram indicating examples of relationships between a transform coefficient and a quantization parameter each switched by one of switch parameters.

FIG. 29B is a diagram indicating examples of relationships between transform coefficients and a quantization parameter each switched by one of selection parameters. As illustrated in FIG. 29B, a plurality of mapping functions (a linear function or a power function) for mapping transform coefficients to quantization parameters are determined in advance, and a mapping function is selected based on the selection parameters (switch index 1 and switch index 2). For example, a linear function is selected when the selection parameter is switch index 1, and a power function is selected when the selection parameter is switch index 2.

[Signal Dependent Adaptive Inverse Quantization Processing in a Decoder]

Figure 18:
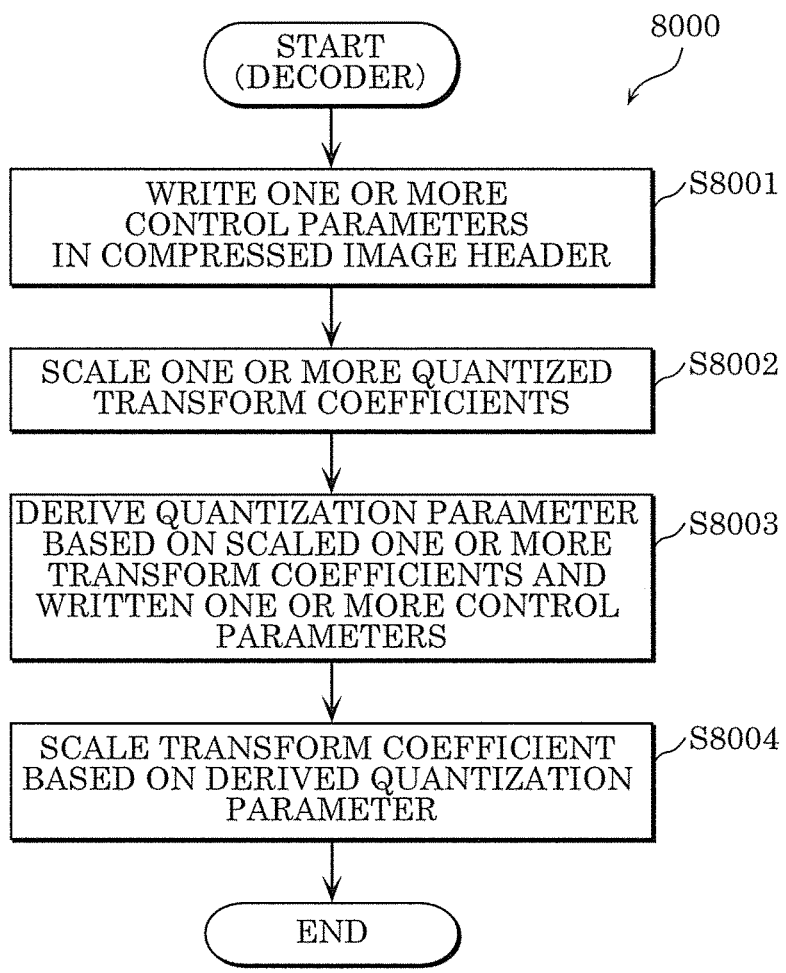
FIG. 18 is a flowchart indicating signal dependent adaptive inverse quantization processing in a decoder according to Variation 3 of Embodiment 1.

FIG. 18 is a flowchart indicating signal dependent adaptive inverse quantization processing 8000 in decoder 200 according to Variation 3 of Embodiment 1. Signal dependent adaptive inverse quantization processing 8000 illustrated in FIG. 16 is mainly performed by inverse quantizer 204C (FIG. 26) to be described later.

First, in Step S8001, one or more control parameters are parsed from a compressed image header. These control parameters may be strength parameters or selection parameters.

Next, in Step S8002, one or more quantized transform coefficients (first transform coefficients) are scaled.

In Step S8003, a new quantization parameter is derived based on the transform coefficients scaled in Step S8002 and the control parameters parsed in Step S8001. In this variation, the relationship between the quantization parameter and the transform coefficients used to derive the quantization parameter is adjustable by the one or more strength parameters. In addition, in the deriving of the quantization parameter, a plurality of mapping functions switchable by one or more selection parameters may be used. In other words, the relationship between the transform coefficients and the quantization parameter is determined based on the one or more control parameters (one or more strength parameters or one or more selection parameters), and a quantization parameter is derived based on the determined relationship. For example, the relationship between the transform coefficients and the quantization parameter is represented according to a linear function, and when the one or more control parameters are one or more strength parameters, the tilt of the linear function is adjusted by the strength parameter, and a quantization parameter is derived from the transform coefficients using the adjusted tilt. In addition, for example, when the one or more control parameters are one or more selection parameters, one mapping function is selected from among a plurality of pre-defined mapping functions for mapping transform coefficients to quantization parameters, based on the one or more selection parameters, and a quantization parameter is derived from the transform coefficients using the selected mapping function.

Lastly, in Step S8004, the quantized transform coefficient (second transform coefficient) is scaled based on the quantization parameter which has been newly derived in Step S8004.

[Details of Inverse Quantizer of the Decoder]

Figure 26:
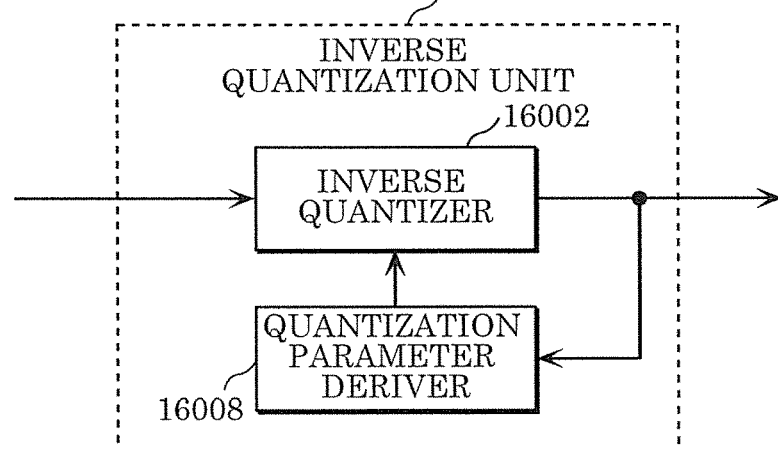
FIG. 26 is a block diagram indicating a detailed functional structure of an inverse quantizer in the decoder according to Variation 3 of Embodiment 1.

FIG. 26 is a block diagram indicating a functional structure of inverse quantizer 204C in decoder 200 according to Variation 3 of Embodiment 1. In this variation, inverse quantizer 204C is included in decoder 200 instead of inverse quantizer 204 in FIG. 10.

As illustrated in FIG. 26, inverse quantizer 204C includes: inverse quantizer 16002; and quantization parameter deriver 16008. Inverse quantizer 16002 inverse-quantizes the quantized coefficients decoded by entropy decoder 202, and outputs the transform coefficients to inverse transformer 206 and quantization parameter deriver 16008.

Quantization parameter deriver 16008 derives a new quantization parameter based on the inverse-quantized transform coefficients and the one or more control parameters, and outputs the derived quantization parameter to inverse quantizer 16002. For example, the one or more control parameters are parsed from an encoded bitstream by entropy decoder 202.

As described above, encoder 100 and decoder 200 according to this variation are capable of adjusting the relationship between the quantization parameter and the first transform coefficients using one or more strength parameters. In this variation, in the deriving of the quantization parameter, a plurality of mapping functions switchable by one or more selection parameters may be used. Subsequently, the one or more strength parameters and the one or more selection parameters are written into a header of the encoded bitstream.

In this way, the relationship between the transform coefficients and the quantization parameter in the deriving of the quantization parameter is adjustable or switchable. Accordingly, it is also possible to derive more appropriate quantization parameter, which enables enhancement of subjective image quality and increase in coding efficiency.

Although the one or more control parameters are included in the signal in this variation, it is to be noted that one or more control parameters do not always need to be signalled. For example, one or more control parameters may be determined based on the quantization parameter used to inverse-quantize coefficients of a block different from a current block. For example, strength parameters may be set such that a strength parameter having a larger value is used when a quantization parameter used to inverse-quantize coefficients of a block different from a current block has a larger value. In addition, for example, selection parameters may be determined according to the value of the quantization parameter used to inverse-quantize coefficients of a block different from a current block.

It is to be noted that the above variations of Embodiment 1 may be combined. For example, all Variation 1 to Variation 3 may be combined, or any two of Variation 1 to Variation 3 may be combined.

Embodiment 2

In each of the embodiment and variations described above, each of the functional blocks may be generally implemented by an MPU, a memory, or the like. In addition, the processing performed by each of the functional blocks is generally enabled by means of a program execution unit such as a process reading out and executing software (a software program) recorded in a recording medium such as an ROM or the like. The software may be distributed by downloading or the like, and may be recorded in a recording medium such as a semiconductor memory and distributed. It is to be noted that each of the functional blocks may be implemented by hardware (exclusive circuit) as a matter of course.

In addition, the processing described in each of the embodiment and variations may be implemented by means of a single apparatus (system) performing centralized processing or by means of a plurality of apparatuses performing distributed processing. In addition, the program may be executed by a single processor or plural processors. In other words, either centralized processing or distributed processing may be executed.

The present invention can be modified in various ways without being limited to the above embodiment and variations, and these modifications may be included in the scope of the present invention.

An application example of the video encoding method (image encoding method) or the video decoding method (image decoding method) indicated in the above embodiment and variations and a system using the application example is described hereinafter. The system is characterized by including an image encoder that performs an image encoding method, an image decoder that performs an image decoding method, and an image encoder and decoder that includes the both. The other elements in the system may be changed appropriately according to cases.

Usage Examples

Figure 30:
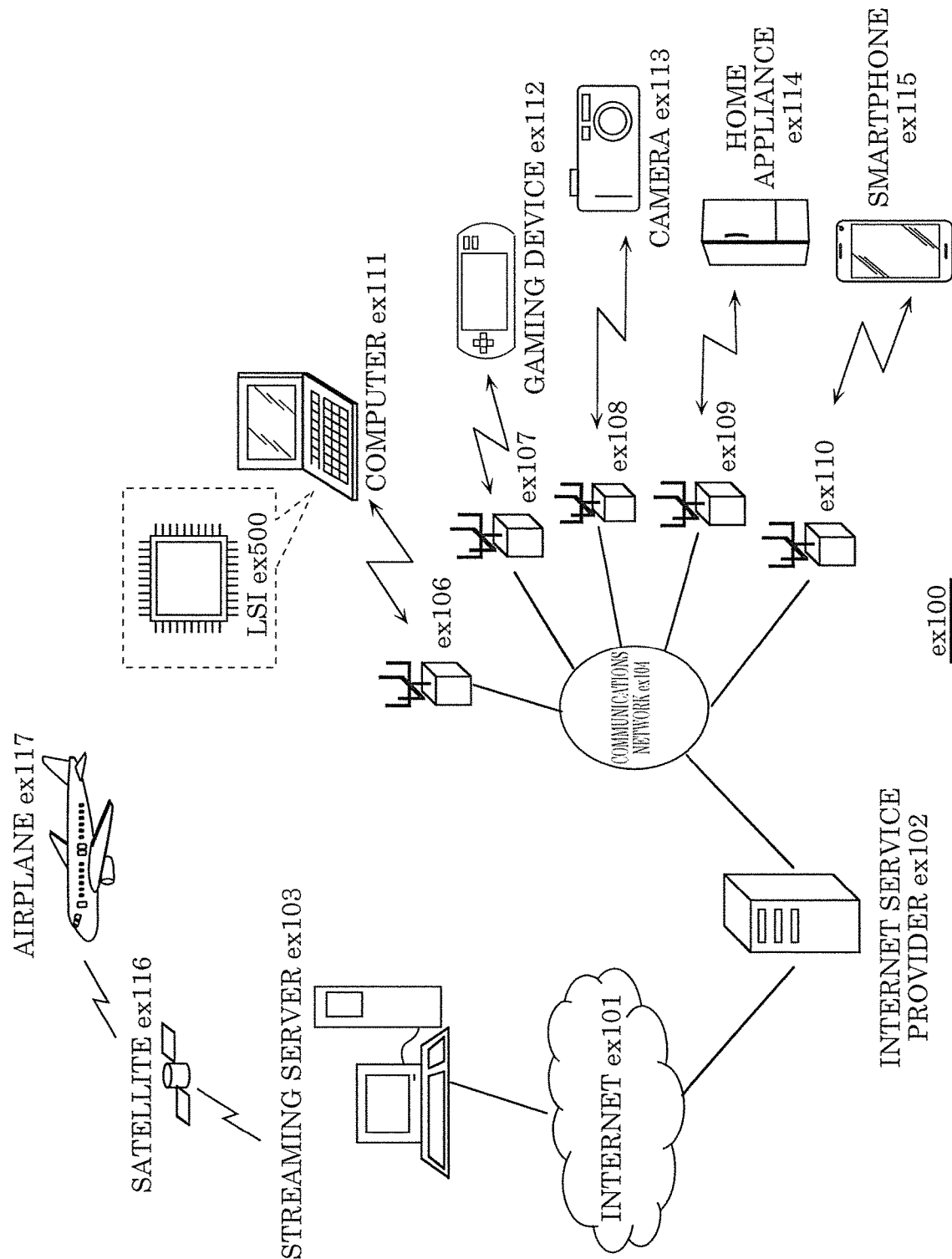
FIG. 30 illustrates an overall configuration of a content providing system for implementing a content distribution service.

FIG. 30 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoding device according to one aspect of the present invention.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoding device according to one aspect of the present invention.

(Decentralized Processing)

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

(3D, Multi-Angle)

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoding device may obtain or store virtual object information and three-dimensional data, generate two-dimensional images based on movement from the perspective of the user, and then generate superimposed data by seamlessly connecting the images. Alternatively, the decoding device may transmit, to the server, motion from the perspective of the user in addition to a request for virtual object information, and the server may generate superimposed data based on three-dimensional data stored in the server in accordance with the received motion, and encode and stream the generated superimposed data to the decoding device. Note that superimposed data includes, in addition to RGB values, an a value indicating transparency, and the server sets the a value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoding device or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

(Scalable Encoding)

Figure 31:
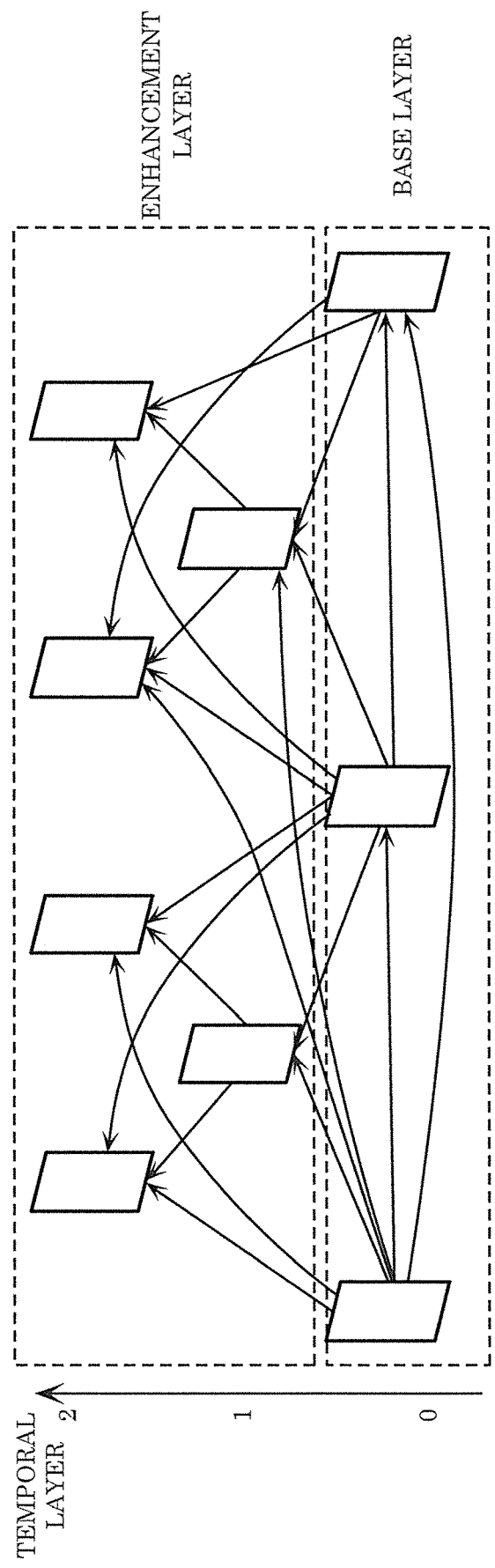
FIG. 31 illustrates one example of encoding structure in scalable encoding.

The switching of content will be described with reference to a scalable stream, illustrated in FIG. 31, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 118. Note that there may be a plurality of individual streams that are of the same content but different quality. In other words, by determining which layer to decode up to based on internal factors, such as the processing ability on the decoding device side, and external factors, such as communication bandwidth, the decoding device side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoding device side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 32:
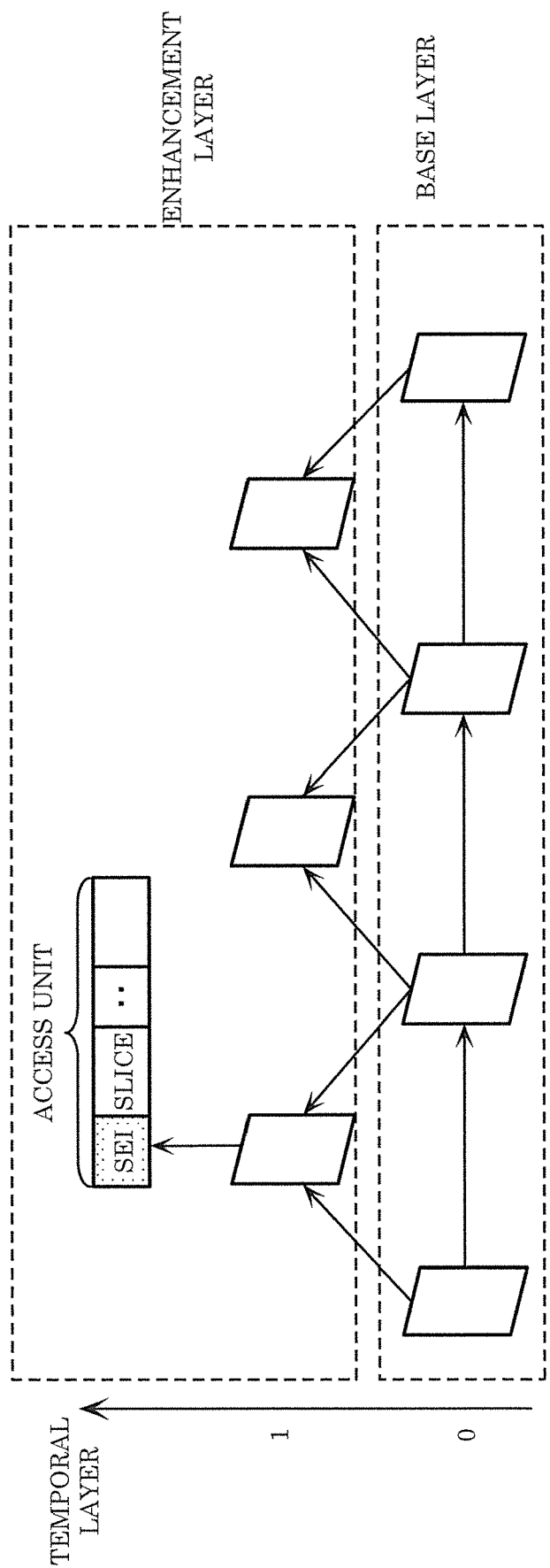
FIG. 32 illustrates one example of encoding structure in scalable encoding.

Alternatively, a configuration in which a picture is divided into, for example, tiles in accordance with the meaning of, for example, an object in the image, and on the decoding device side, only a partial region is decoded by selecting a tile to decode, is also acceptable. Moreover, by storing an attribute about the object (person, car, ball, etc.) and a position of the object in the video (coordinates in identical images) as metadata, the decoding device side can identify the position of a desired object based on the metadata and determine which tile or tiles include that object. For example, as illustrated in FIG. 32, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoding device side can obtain, for example, the time at which a specific person appears in the video, and by fitting that with picture unit information, can identify a picture in which the object is present and the position of the object in the picture.

(Web Page Optimization)

Figure 33:
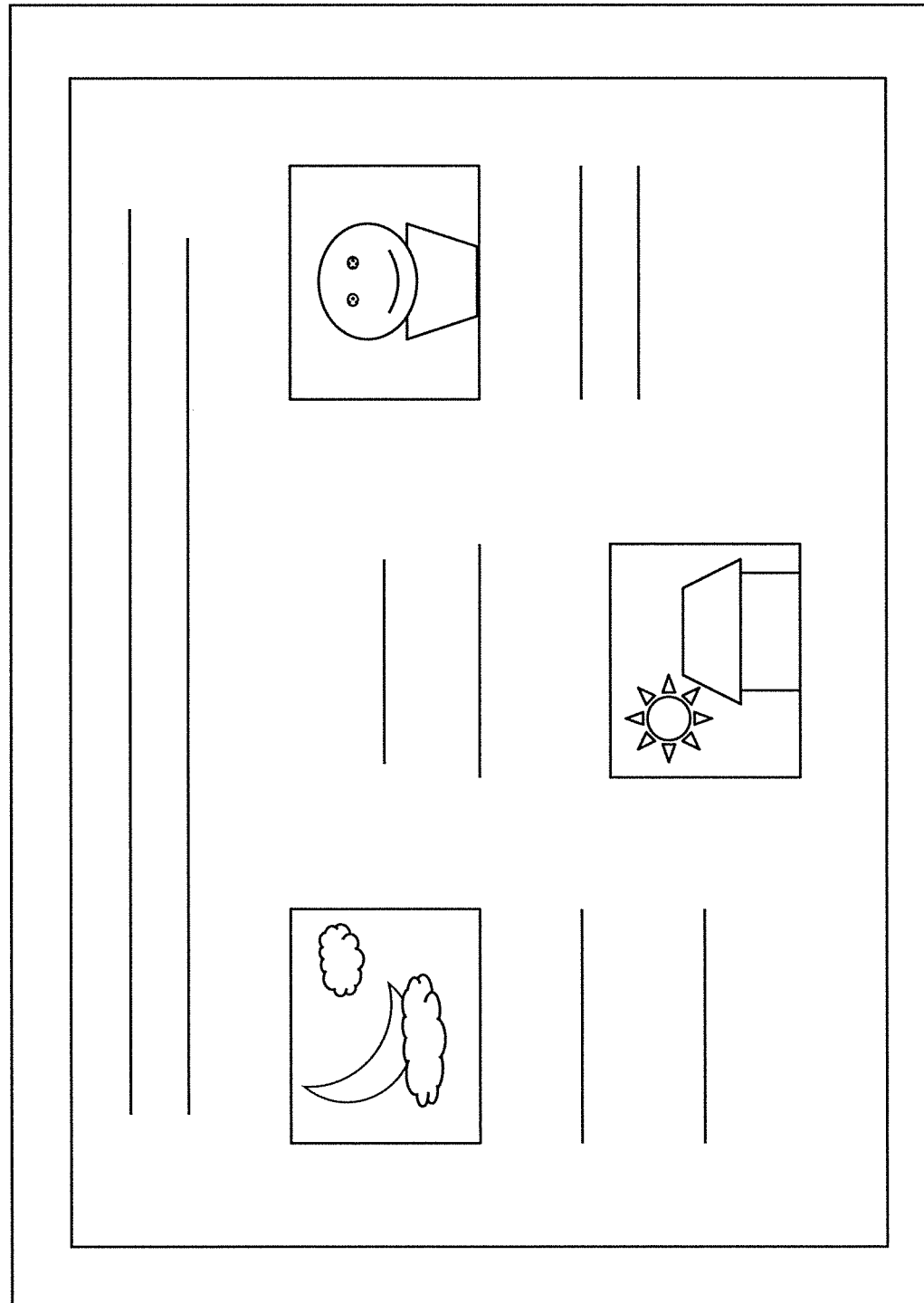
FIG. 33 illustrates an example of a display screen of a web page.
Figure 34:
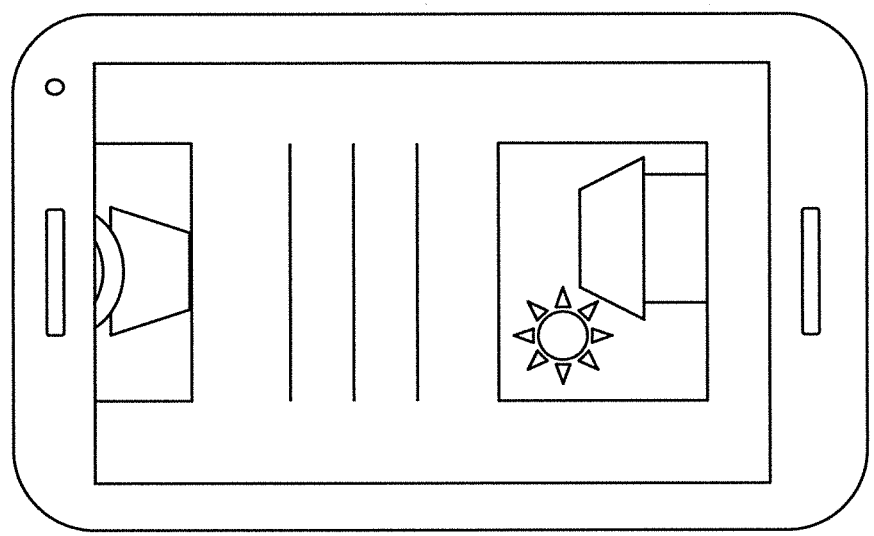
FIG. 34 illustrates an example of a display screen of a web page.

FIG. 33 illustrates an example of a display screen of a web page on, for example, computer ex111. FIG. 34 illustrates an example of a display screen of a web page on, for example, smartphone ex115. As illustrated in FIG. 33 and FIG. 34, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoding device) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

(Autonomous Driving)

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

(Streaming of Individual Content)

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server either when prompted or automatically edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture the head region may be replaced with another image as the person moves.

Moreover, since there is a demand for real-time viewing of content produced by individuals, which tends to be small in data size, the decoding device first receives the base layer as the highest priority and performs decoding and reproduction, although this may differ depending on bandwidth. When the content is reproduced two or more times, such as when the decoding device receives the enhancement layer during decoding and reproduction of the base layer and loops the reproduction, the decoding device may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

Other Usage Examples

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoding device (image encoding device) or the moving picture decoding device (image decoding device) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

(Hardware Configuration)

Figure 35:
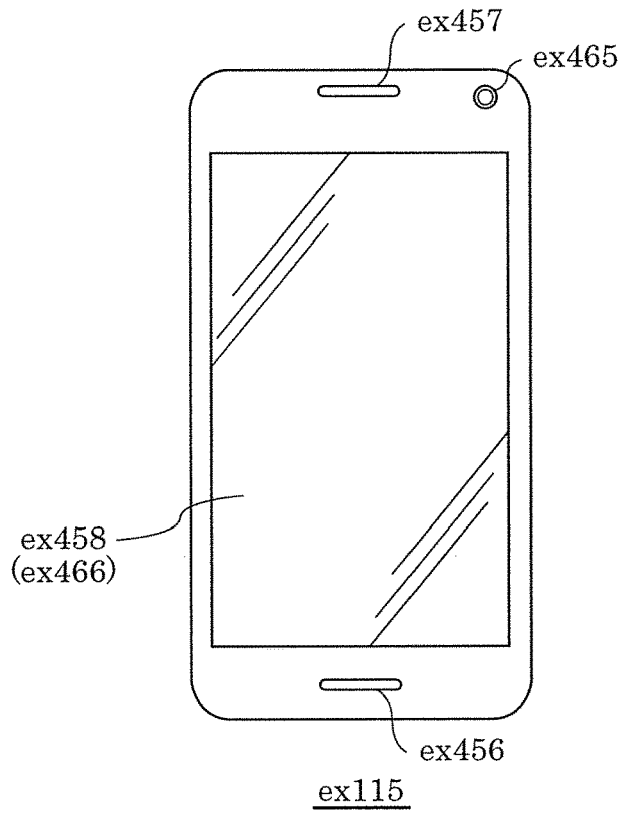
FIG. 35 illustrates one example of a smartphone.
Figure 36:
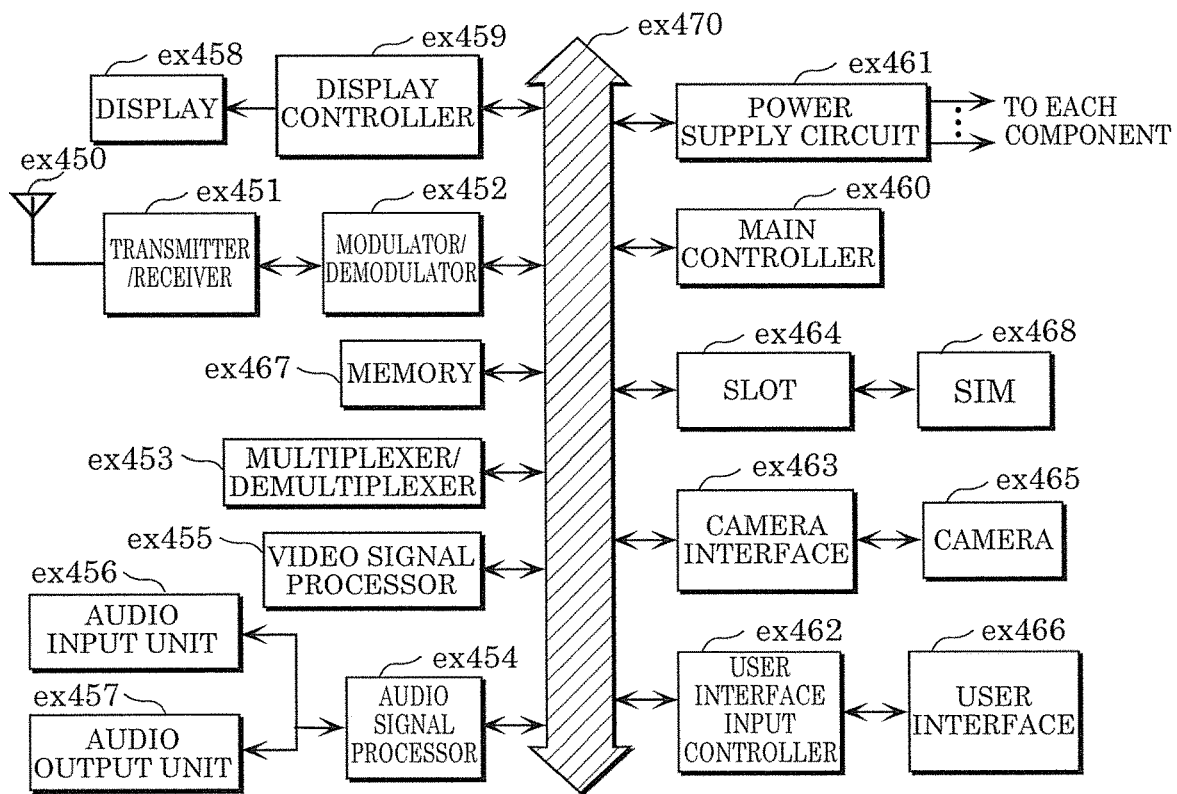
FIG. 36 is a block diagram illustrating a configuration example of a smartphone.

FIG. 35 illustrates smartphone ex115. FIG. 36 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoding device and a decoding device; a transmitter terminal including only an encoding device; and a receiver terminal including only a decoding device. Further, in the description of the digital broadcasting system, an example is given in which multiplexed data obtained as a result of video data being multiplexed with, for example, music data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

INDUSTRIAL APPLICABILITY

The present disclosure is applicable to an encoder which encodes video and a decoder which decodes encoded video.

REFERENCE MARKS IN THE DRAWINGS 100 encoder
102 splitter
104 subtractor
106 transformer
108 quantizer
110 entropy encoder
112, 112A, 112B, 112C, 204, 204A, 204B, 204C inverse quantizer
114, 206 inverse transformer
116, 208 adder
118, 210 block memory
120, 212 loop filter
122, 214 frame memory
124, 216 intra predictor
126, 218 inter predictor
128, 220 prediction controller
200 decoder
202 entropy decoder
9003, 10002, 11003, 12002, 13003, 14002, 15003, 16002 inverse quantizer
9010, 10008, 11010, 12008, 13010, 14008, 15010, 16008 quantization parameter deriver
11011, 12009 transformer

The invention claimed is:

1. A decoding method, comprising:
inverse-quantizing one or more first transform coefficients quantized, based on a pre-defined quantization-related parameter, the one or more first transform coefficients belonging to an image block;
deriving a quantization-related parameter based on the one or more first transform coefficients inverse-quantized; and
inverse-quantizing a second transform coefficient quantized, based on the quantization-related parameter derived based on the one or more first transform coefficients inverse-quantized, the second transform coefficient belonging to the same image block as the one of more first transform coefficients.

2. The decoding method according to claim 1, further comprising:
transforming a prediction signal of a current block to be encoded into one or more third transform coefficients,
wherein in the deriving of a quantization-related parameter, the quantization-related parameter is derived based on the one or more first transform coefficients inverse-quantized and the one or more third transform coefficients transformed from the prediction signal of the current block to be decoded.

3. The decoding method according to claim 1, further comprising:
determining an activity measure based on a prediction signal of a current block to be decoded,
wherein in the deriving of a quantization-related parameter, the quantization-related parameter is derived based on the one or more first transform coefficients inverse-quantized and the activity measure determined.

4. The decoding method according to claim 1,
wherein a relationship between the quantization-related parameter and the one or more first transform coefficients is adjustable according to one or more strength parameters.

5. The decoding method according to claim 1,
wherein in the deriving of a quantization-related parameter, a relationship out of a plurality of pre-defined relationships between one or more first transform coefficients and quantization-related parameters is selected based on one or more selection parameters, and the quantization-related parameter is derived from the one or more first transform coefficients inverse-quantized, based on the relationship selected.

6. The decoding method according to claim 4,
wherein the one or more strength parameters are written in a header of an encoded bitstream.

7. The decoding method according to claim 5,
wherein the one or more selection parameters are written in a header of an encoded bitstream.

8. The decoding method according to claim 1,
wherein the one or more first transform coefficients comprise a plurality of first transform coefficients, and the plurality of first transform coefficients and the second transform coefficient are included in a same current block to be decoded,
the plurality of first transform coefficients are scanned before the second transform coefficient in pre-defined scanning order, and
in the deriving of a quantization-related parameter, the quantization-related parameter is derived based on a cumulative sum of the plurality of first transform coefficients.

9. A decoding apparatus, comprising:
an inverse quantizer which inverse-quantizes one or more first transform coefficients quantized, based on a pre-defined quantization-related parameter, the one or more first transform coefficients belonging to an image block; and
a deriver which derives a quantization-related parameter based on the one or more first transform coefficients inverse-quantized; P1 wherein the inverse quantizer further inverse-quantizes a second transform coefficient quantized, based on the quantization-related parameter derived based on the one or more first transform coefficients inverse-quantized, the second transform coefficient belonging to the same image block as the one of more first transform coefficients.

* * * * *